Figure 1:
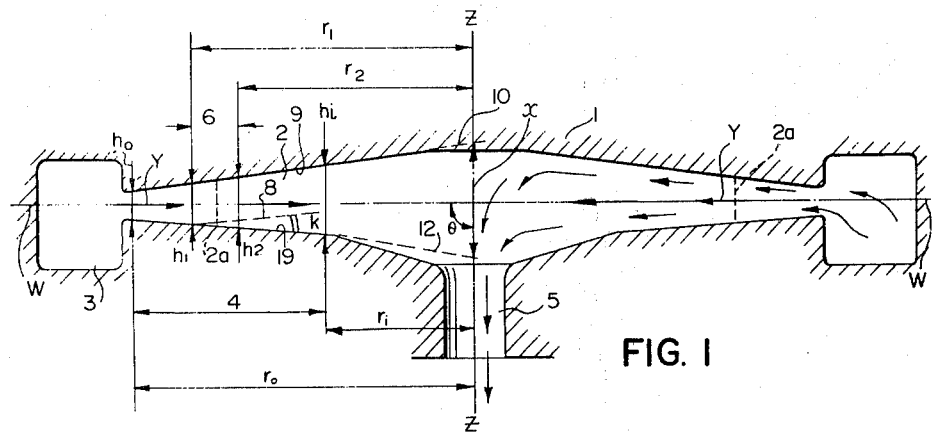

United States Patent [19]

Hayes et al.

[11] 4,003,405
[45] Jan. 18, 1977

[54] APPARATUS FOR REGULATING THE FLOW RATE OF A FLUID

[75] Inventors: William F. Hayes; John W. Tanney, both of Ottawa; Helen G. Tucker, Orleans, all of Canada

[73] Assignee: Canadian Patents and Development Limited, Ottawa, Canada

[22] Filed: Mar. 1, 1976

[21] Appl. No.: 662,842

[30] Foreign Application Priority Data

Mar. 26, 1975 Canada .......................... 223118

[52] U.S. Cl. .................................. 138/40; 138/42; 138/43; 138/45; 138/46; 137/810; 137/811; 137/813

[51] Int. Cl.² ................. F15D 1/00; F15D 1/02; F15D 1/04; F15D 1/06

[58] Field of Search ............. 138/40, 39, 37, 41, 138/42, 43, 44, 45–46; 137/810–813

[56] References Cited

UNITED STATES PATENTS

| | | | |
|---|---|---|---|
| 2,893,432 | 7/1959 | Gibson | 138/42 X |
| 3,195,303 | 7/1965 | Widell | 137/813 X |
| 3,198,214 | 8/1965 | Lorenz | 137/813 |
| 3,276,259 | 10/1966 | Bowles et al. | 137/813 X |
| 3,290,947 | 12/1966 | Reilly | 137/812 |
| 3,324,891 | 6/1967 | Rhoades | 138/43 |
| 3,336,931 | 8/1967 | Fox et al. | 137/813 |
| 3,413,995 | 12/1968 | Bowles et al. | 137/813 |
| 3,431,930 | 3/1969 | Bowles | 137/813 X |
| 3,474,670 | 10/1969 | Rupert | 137/812 X |
| 3,515,158 | 6/1970 | Utz | 137/812 |

Primary Examiner—Henry K. Artis
Attorney, Agent, or Firm—Francis W. Lemon

[57] ABSTRACT

An apparatus for regulating the flow rate of a fluid, comprising a casing having an annular or cone-shaped fluid passage, for radial flow (inwardly or outwardly) between an inlet and outlet which are spaced radially and form unobstructed flow paths to the whole of the fluid passage. The geometry of the fluid passage is defined for a compressible and incompressible fluid so that laminar flow is achieved in the fluid passage. The apparatus further provides a very rapid dynamic response, essentially free of hysteresis, and substantially no internal generation of fluid flow turbulence resulting in a minimum of noise and freedom from cavitation. In an adjustable configuration the apparatus provides a proportional fluid valving function. In a nonadjustable configuration the apparatus provides a laminar flow restriction.

14 Claims, 22 Drawing Figures

FIG. 1

APPARATUS FOR REGULATING THE FLOW RATE OF A FLUID

This invention relates to an apparatus for regulating the flow rate of a fluid.

More particularly this invention relates to an apparatus for regulating the flow rate of a fluid as a unique function of a force, pressure, or mechanical position generated in response to an appropriate demand or control signal.

The regulation of fluid flow rate by means of a valve which impedes or restricts the flow of fluid through passages in the valve is one of the most common components in apparatus for handling fluids such as encountered in chemical processing plants, gas pipeline distribution systems, water supply systems, power transmitting hydraulic systems, as well as in many other widely known fluid handling systems.

Known fluid flow rate regulating valves may be divided into two main types, mechanical valves where their operation is dependent in whole or in part upon the relative movement or deflection of a component or components of the valve and non-mechanical valves where their operation does not require the relative movement or deflection of a component or components. Typical examples of non-mechanical valves are the visco-electric valve which utilizes an electric field potential across a flowing or stationary fluid, such as hydraulic oil containing additives which drastically alter the viscosity of the fluid under the influence of such electrical field as described in U.S. Pat. No. 2,417,850 granted to W. M. Winslow, March, 1947, and the fluidic vortex valve which utilizes fluid dynamic effects within a swirling flow field to generate substantial pressure drops across and/or flow rate reduction through the valve as described in U.S. Pat. No. 3,276,259 granted to R.E. Bowles, October, 1966.

In U.S. Pat. No. 3,405,907, granted to L. T. Kayser, October, 1968, there is shown a venturi arrangement for controlling fluid passing therethrough substantially independantly of pressure variations downstream of the venturi arrangement. The venturi arrangement comprises a housing means having a central inlet to an annular-shaped passage leading to an outer, annular chamber having a tubular outlet. In this venturi arrangement fluid fed in an axial direction into the central inlet passes radially outwardly through the annular-shaped passage to the outer, annular chamber. The annular-shaped passage has a length and width such that its peripheral cross-section gradually increases in a radially outward direction to a cross-section several times larger than its smallest cross-section. According to Kayser, fluid cavitating and partly evaporating in the region of smallest cross-section of the annular-shaped passage is recondensed in the larger cross-secton to produce a constant flow through the venturi arrangement which is independant of fluid pressure variations downstream of the annular shaped passage. One side of the annular-shaped passage is formed by a disc-shaped membrane and the width of the annular-shaped passage is adjustable by means of a central piston which is slidable in the casing towards the central inlet by a screw means. It will be clear from the foregoing that the Kayser venturi arrangement relies upon two phase flow to achieve a flow rate substantially independent of downstream pressure variations, and so as will be commonly understood by those skilled in the art this precludes laminar flow in the mixed phase flow region. In contrast the apparatus according to the present invention has a fluid passage geometry wherein laminar flow occurs along the annular-shaped passage which has attendant advantages which will become apparent from the following description of the present invention and which are not provided by the Kayser venturi arrangement which is directed towards satisfying a different requirement.

In this specification, a fluid may consist of a gas, a liquid, a liquid containing a dissolved gas or dissolved gases, a mixture of gas and liquid, gas and suspended solids, liquid and suspended solids, or a mixture of gas, liquid and suspended solids, where it can be assumed that such mixtures have the properties of either a compressible or an incompressible fluid.

Further, in this specification, Newtonian fluids are defined as those exhibiting a direct proportionality between shear stress and shear rate in laminar flow at a fixed fluid temperature and pressure.

Further, in this specification, substantially Newtonian fluids are defined as those exhibiting shear stress dependency upon shear rate in laminar flow at a fixed fluid temperature and pressure which may be realistically approximated by that of a Newtonian fluid over a fluid shear rate range as limited by the laminar flow rate requirements within a particular fluid passage geometry.

Further, in this specification, laminar flow is defined as that having insignificant random or irregular flow velocity components in contrast with turbulent flow where such irregularities are significant.

Further, in this specification, a closure means is defined as a mechanically variable fluid flow passage restriction of any type as will be known to those skilled in the state of the art which may be continuously or incrementally adjusted from a minimum fluid flow rate or a closed position to some maximum fluid flow rate as limited by the geometry of the restriction and the pressure drop applied across the restriction, or which may be continuously or incrementally adjusted over some finite range of fluid flow rate as limited by the geometry of the restriction and the pressure drop across the restriction.

Further, in this specification, an elastic material is defined as a substance capable of sustaining stress without permanent deformation while substantially conforming to the law of stress-strain proportionality.

Yet further, in this specification, the casing is defined as a structural member or combination of members which may be comprised, in part, of a member or members with flexibility in one directon and which surrounds and defines in whole or in part an annular shaped passage, and an inlet cavity, and an outlet cavity therein for the flow of fluid therethrough.

There exists a substantial number of different identifiable types of mechanical fluid flow rate regulating or controlling valves including butterfly valves, ball valves, plug valves, gate valves, etc. Furthermore, there exists a large variety of particular configurations of such valve types incorporating a multitude of differing flow passage geometries, actuating means, sealing means, flow restricting moving component geometries etc. as required for use with particular fluids and/or specific applications as described in I.S.A. Handbook of Control Valves, Chapter 3, J. W. Hutchison, Instrument Society of America, Pittsburgh Penn. The operation of such known mechanical type valves depends on the conversion of fluid static pressure to fluid velocity by means of a reduction in the flow passage effective cross-sectional area with an associated turbulent dissipation within the fluid of a portion of the generated fluid velocity energy. The required flow area reduction is implemented by a variable mechanical restriction within the fluid flow passage of the valve which impedes the fluid flow such that a significant fluid static pressure drop occurs across the restriction corresponding to the increase in fluid velocity through the restriction in accordance with the well known Bernoulli relation as given in consistent units by the relationship:

$$\Delta p = \tfrac{1}{2} (\rho (\Delta U)^2/g)$$

where
  $\Delta p$ = static pressure drop across the restriction
  $\rho$ = fluid density
  $\Delta U$ = increase in fluid velocity through the restriction
  $g$ = acceleration due to gravity,
when the fluid is incompressible and fluid dynamic energy dissipation within the restriction is negligible.

It may be shown that the fluid flow rate through a mechanical valve, in the given through-flow direction, is a unique function of the variable restriction geometry for a given flow passage configuration and pressure drop across the restriction, the said function being dependent on the particular portion of the dynamic energy associated with the fluid velocity that is dissipated. Analytical relationships have been formulated for some widely used valve configurations which relate the variable geometry, the pressure drop and the fluid flow rate. Such relationships will be well known to those skilled in the art and may be found in many standard texts concerned with control valves, fluid flow, fluid power, fluid dynamics etc.

There is a need for an apparatus which is capable of regulating the flow rate of a fluid flowing through such apparatus which is economical to manufacture, easy to disassembly and clean, capable of attaining very rapid dynamic response, essentially free of hysteresis and which generates internally a minimum of fluid flow turbulence relative to known types of mechanical valves of equivalent performance with respect to flow range, pressure drop, linearity and sensitivity of control or regulation.

It is an object of the present invention to regulate the flow rate of a fluid through an apparatus which contains, at least in part, a thin fluid passage wherein the flow of fluid is essentially two-dimensional and is laminar such that there is no noise producing turbulence induced in the flow within the thin passage, and further such turbulence as is present upstream of the laminar flow within the passage tends to be suppressed by viscous damping within the laminar flow.

According to the present invention there is provided an apparatus for regulating the flow rate of a fluid comprising:

a. a casing having, when the apparatus is regulating the flow rate of a fluid, a fluid passage which is symmetrical about an axis and is annular shaped when viewed in the direction of the said axis and has a geometry such that any sectional area of the fluid passage which is symmetrical about the said axis and is normal to the mean direction for the flow of fluid therein forms a curved surface within the range of the curved surface of a frustrum of a cone and the curved surface of a circular cylinder, a fluid inlet cavity in the casing, for connection to a source of pressurized fluid, the fluid inlet cavity being coaxial with the annular shaped fluid passage and forming a substantially unobstructed flow path for fluid to the whole of a peripheral inlet area to the annular shaped fluid passage, and fluid outlet means coaxial with the annular shaped fluid passage and spaced radially from the fluid inlet cavity, the fluid outlet means being for the escape of fluid from the fluid passage and forming a substantially unobstructed flow path, from the whole of a peripheral outlet area of the annular shaped fluid passage, for fluid which has flown through the annular shaped of the fluid passage from the fluid inlet cavity, and wherein, b. when the apparatus is regulating the flow rate of a fluid, the flow of fluid along the whole length of the fluid passage, and in the mean direction of fluid flow therein, is laminar as evidenced by the fluid passage geometry comforming with the relationships in the following equations designated (1) to (8):

i. for a fluid, having the characteristics of a substantially incompressible, substantially Newtonian fluid, flowing through the fluid passage, if the fluid passage is divided into incremental portions for which the centerline of the fluid passage generally in the mean direction of fluid flow may be assumed to be substantially straight, then the fluid static pressure drop $(p_2 - p_1)$ in each incremental portion conforms with the following relationship in consistent units:

$$(p_2 - p_1) = \frac{-1.21 \, G^2}{g \, (2\pi)^2 \, (\sin\theta)^2 \, \rho} (A) + \frac{6 \mu G \, (B)}{\pi \rho \, (\sin\theta)} \qquad (1)$$

where A and B are geometric parameters of the incremental portion under consideration and are defined, in consistent units by the relationships:

$$A = \frac{k \, (\sin\theta)}{x^3} \left( \frac{1}{r_2} - \frac{1}{r_1} \right) + \frac{(\sin\theta)^2}{2x^2} \left[ \frac{1}{(r_2)^2} - \frac{1}{(r_1)^2} \right] + \frac{k^2}{x^3} \left( \frac{1}{h_2} - \frac{1}{h_1} \right) + \frac{k^2}{2x^2} \left[ \frac{1}{(h_2)^2} - \frac{1}{(h_1)^2} \right] \qquad (2)$$

$$B = \frac{1}{x^3} \ln \left( \frac{r_2}{r_1} \right) - \frac{1}{x^3} \ln \left( \frac{h_2}{h_1} \right) + \frac{1}{x^2} \left( \frac{1}{h_2} - \frac{1}{h_1} \right) + \frac{1}{2x} \left[ \frac{1}{(h_2)^2} - \frac{1}{(h_1)^2} \right] \qquad (3)$$

where $k = \dfrac{\sin\theta \, (h_1 - h_2)}{(r_2 - r_1)}$ \qquad (4)

and $$x = h_2 + k \left( \frac{r_2}{\sin\theta} \right) \qquad (5)$$

and where
 $r_1$ = the radius of that incremental portion at which $p_1$ occurs and where the radius is measured from the said axis of symmetry of the fluid passage to a first limit of the centerline of that incremental portion of the fluid passage in the mean direction of flow therealong,
 $r_2$ = the radius of that incremental portion at which $P_2$ occurs and where the radius is measured from the said axis of symmetry of the fluid passage to a second limit of the centerline of that incremental portion of the fluid passage in the mean direction of fluid flow therealong and downstream of the first limit,
 $h_1$ = the lesser dimension of that incremental portion, transverse to the mean direction flow of fluid therethrough, at the radius $r_1$,
 $h_2$ = the lesser dimension of that incremental portion, transverse to the mean direction of flow of fluid therethrough, at the radius $r_2$,
 $\theta$ = the slope of the centerline of that incremental portion in the mean direction of fluid flow relative to the said axis of symmetry of the fluid passage, and is in the range greater than 0° up to and less than 180°,
 $k$ = mean slope of one boundary wall of that incremental portion relative to the opposite boundary wall thereto,
 $x$ = equivalent height of that incremental portion at the said axis of symmetry of the fluid passage as indicated by projecting the mean slope of each of the fluid passage boundary walls of that incremental portion to the said axis of symmetry,
 $G$ = mass flow rate of fluid flowing along the fluid passage,
 $\rho$ = density of fluid flowing along the fluid passage,
 $\mu$ = absolute viscosity of fluid flowing along the fluid passage, and
 $g$ = acceleration due to gravity, and ii. for a fluid, having the characteristics of a substantially compressible, substantially Newtonian fluid, flowing through the fluid passage, if the fluid passage is divided into incremental portions for which the centerline of the fluid passage generally in the mean direction of fluid flow may be assumed to be substantially straight, and where the fluid static pressure in each incremental portion, at any point on the said centerline of the fluid passage generally in the mean direction of flow of fluid therethrough, is a substantially linear function of the radial distance from the said axis of symmetry of the fluid passage to that point on the said centerline of the fluid passage, then the following relationship exists in consistent units for each incremental portion:

$$\frac{RT}{4}\left[(p_2)^2 - (p_1)^2\right]\left[(r_2)^2 + (r_1)^2\right] = \frac{1.21\ (GRT)^2}{g\ (2\pi)^2}\left[C + \frac{1}{x^2}\ln\left(\frac{p_2}{p_1}\right)\right] + \frac{6\mu G(RT)^2 (\sin\theta)(D)}{\pi} \quad (6)$$

where $C$ and $D$ are geometric parameters of the incremental portion under consideration and are defined, in consistent units, by the relationships:

$$C = \frac{1}{x^2}\ln\left(\frac{r_2}{r_1}\right) - \frac{2}{x^2}\ln\left(\frac{h_2}{h_1}\right) + \frac{2}{x}\left(\frac{1}{h_2} - \frac{1}{h_1}\right) - \frac{1}{2}\left[\frac{1}{(h_2)^2} - \frac{1}{(h_1)^2}\right] \quad (7)$$

$$D = \frac{x}{2k^2}\left[\frac{1}{(h_2)^2} - \frac{1}{(h_1)^2}\right] - \frac{1}{k^2}\left(\frac{1}{h_2} - \frac{1}{h_1}\right) \quad (8)$$

and where similar symbols in the relationships (6), (7), (8), are as previously defined for the relationships (1), (2), (3), (4) and (5) and where
 $\ln$ = hyperbolic or natural logarithm,
 $T$ = the absolute temperature of fluid flowing along the fluid passage where this is found to be substantially constant along a portion of the fluid passage, and
 $R$ = a constant for the substantially compressible fluid flowing along the fluid passage and is in accordance with the relationship $p/\rho_c$ = R.T. where
 $p$ = the absolute static pressure of the fluid at any position along the fluid passage,
 $\rho_c$ = the density of the substantially compresssible fluid at the position along the fluid passage where the absolute static pressure $p$ is defined.

Further, according to the present invention, a fluid passage closure means such as a moveable plug, gate, ball, diaphram or any other closure means as may be known to those skilled in the art, may be located either upstream and/or downstream of the annular shaped fluid passage. The closure means may be actuated in response to a demand or control signal by any suitable means such as will be known to those skilled in the art.

Further, according to the present invention, a moveable member may form one boundary wall of the fluid passage, and means may be provided for moving said member within the casing and along the axis of symmetry of the fluid passage for the adjustment of the geometry of the fluid passage so as to conform with the relationships for the laminar flow of fluid therethrough. Such means may be capable of moving the said member sufficiently to close the fluid passage in a fluidtight manner.

Further, according to the present invention, a flexible disk may form one boundary wall of the fluid passage, and means may be provided for deflecting the flexible disk to obtain a specific geometry, in accordance with the above relationships along the fluid passage length. Such means may be capable of deflecting the flexible disk sufficiently to close the fluid passage in a fluidtight manner. The flexible disk is preferably secured around the periphery thereof to the casing in a fluidtight manner, and the means for deflecting the flexible disk preferably deflects the disk by being urged against a central portion thereof.

Yet further, according to the present invention, two flexible disks may be provided, each forming one of the boundary walls of the fluid passage, and means may be provided for deflecting the flexible disks to obtain a specific geometry, in accordance with the derived relationships, along the fluid passage length. The means for deflecting the flexible disks may be capable of deflecting at least one of the flexible disks sufficiently to close the fluid passage in a fluidtight manner. Preferably the flexible disks are secured around their peripheries, in a fluidtight manner, to opposite sides of the casing, and preferably the means for deflecting the flexible disks deflects them by being urged against central portions thereof.

Yet further, according to the present invention, a flexible disk is secured in a fluidtight manner around its periphery to the casing such that the flexible disk divides the casing into two similar fluid passages, each of which is an annular shaped fluid passage such as that described above. Means are provided for deflecting the flexible disk in either direction for obtaining a specific and interdependent fluid passage geometry in each of the fluid passages. The said deflection means may be capable of deflecting the said disk to seal one or the other of the fluid passages. The fluid inlet cavity defined above is one of two, similar fluid inlet cavities each forming an inlet to one of the fluid passages, and the fluid outlet means defined above is one of two, similar fluid outlet means each forming a fluid outlet from one of the fluid passages. The fluid outlet means from one fluid passage may be connected to the fluid inlet cavity of the other fluid passage so as to obtain a specific fluid valving function analogous to the function of a three port, three way proportional fluid valve. Additionally, such embodiments of the present invention may be further interconnected by suitable fluid flow channels or pipes so as to function, in combination, in a manner analogous to well known valving apparatus such as a four-port, four-way proportional valve.

It will be appreciated that many of the well known valve configurations, described in the previously referenced text entitled "I.S.A. Handbook of Control Valve", could be operated in a mode such that the fluid flow through the flow area restriction is essentially laminar as evidenced by the total pressure drop across the restriction being approximately proportional to the fluid mass flow rate therethrough. However, it will be further appreciated that such a laminar flow mode of operation is, in general, only possible when such known valves are approaching their closed positions, and when the pressure drop across their restrictions are not large, and when the viscosity of the fluid flowing therethrough is substantial. Thus the usefulness of known configurations of valves is unduly limiting in their operation when a substantial portion of the fluid flow through the area restriction of the valve is laminar.

In contrast, it is an object of the present invention to provide an apparatus for the regulation of the flow rate of a fluid in which flow of the fluid through an area restriction is predominately laminar over a defined range of operation which may be both extended and useful and in which a very substantial pressure drop may be generated across the said restriction by means of fluid viscous shearing effects within the laminar flow.

Figure 2:
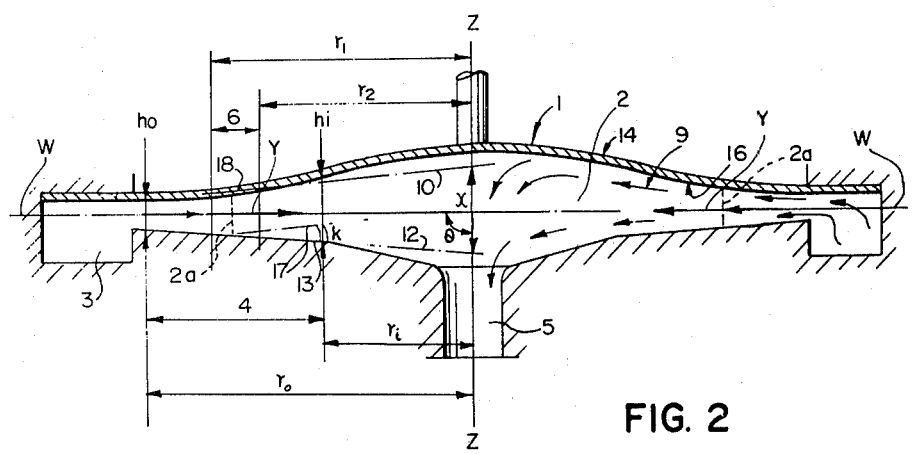
Figure 3:
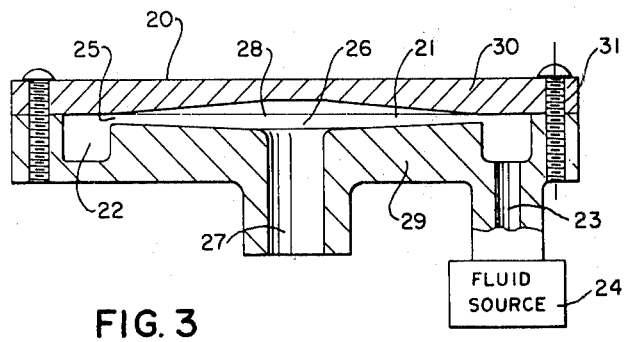
Figure 4:
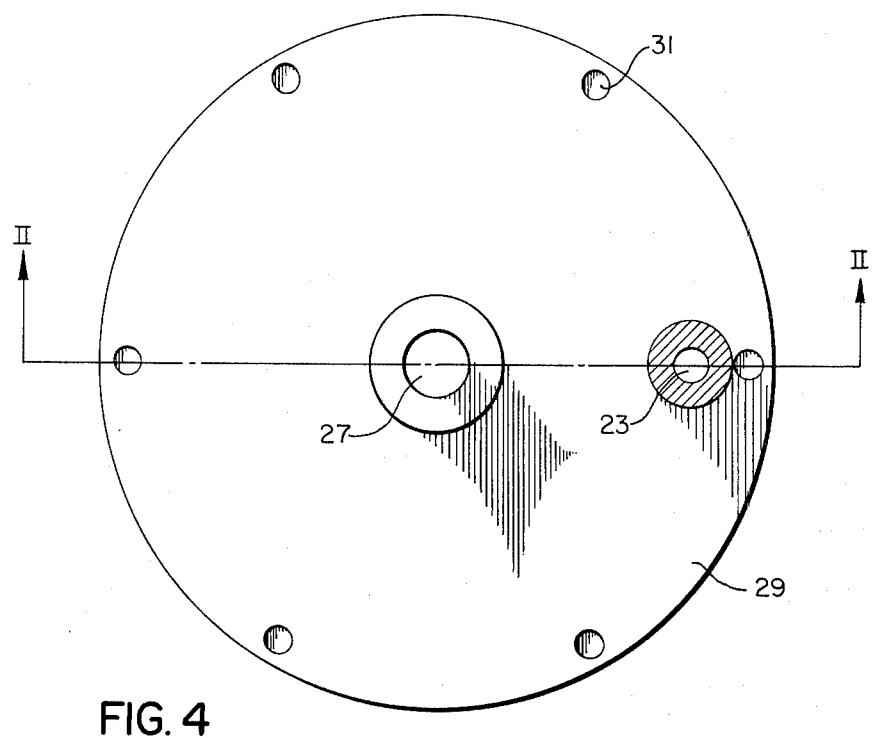
Figure 5:
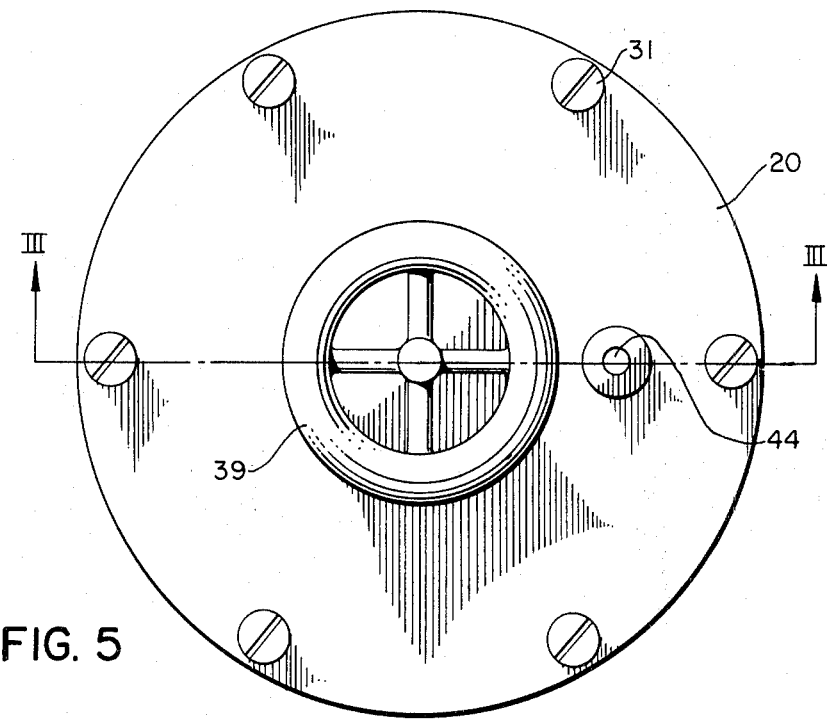
Figure 6:
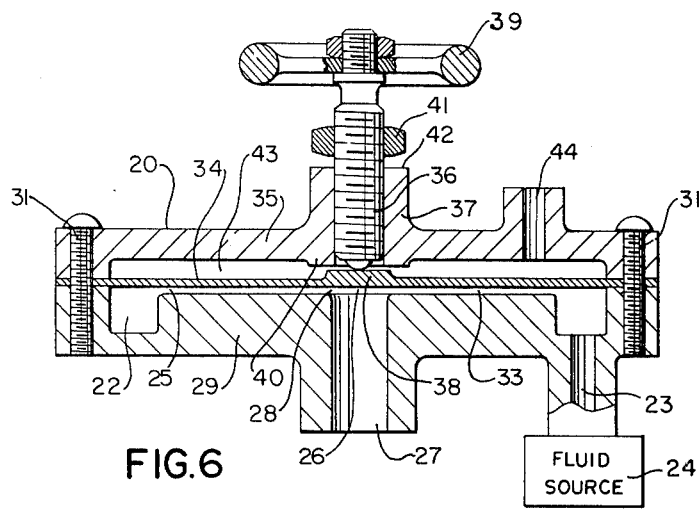
Figure 9:
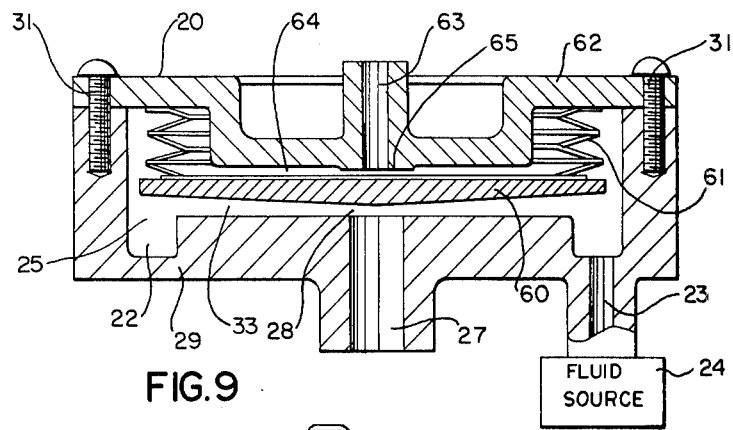
Figure 10:
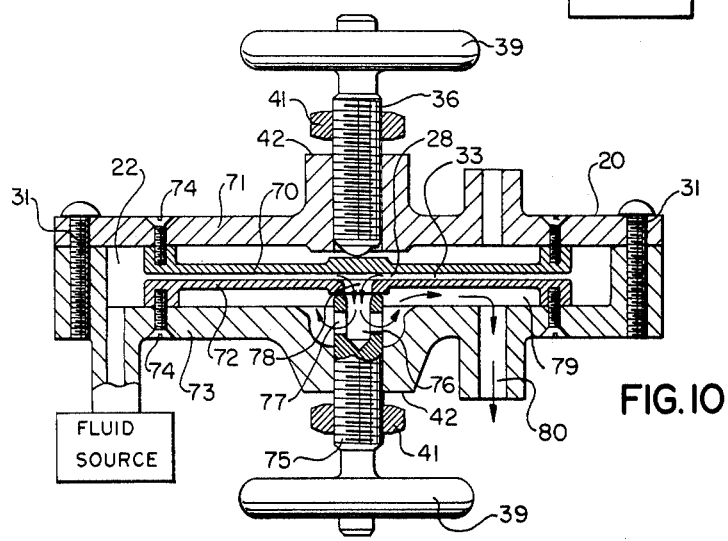
Figure 7:
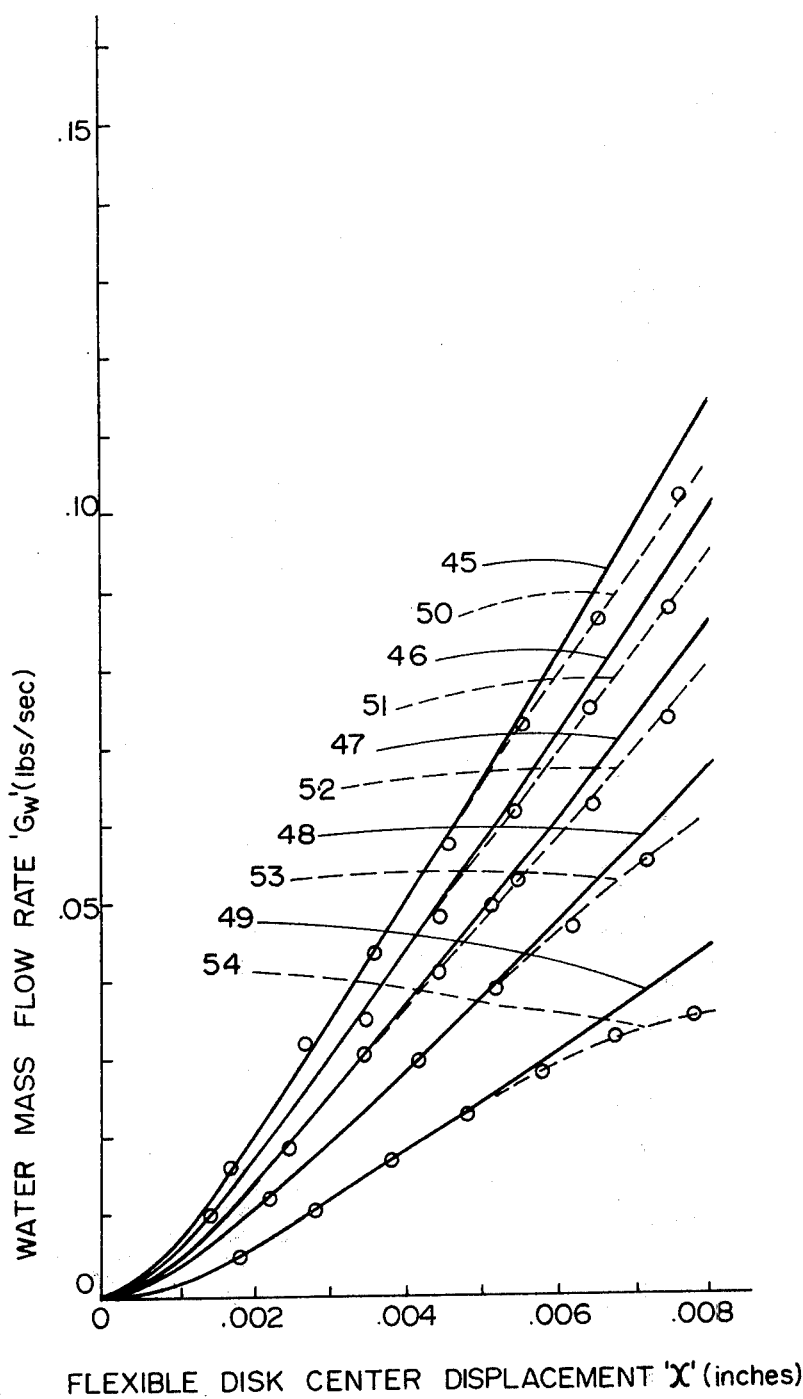
Figure 8:
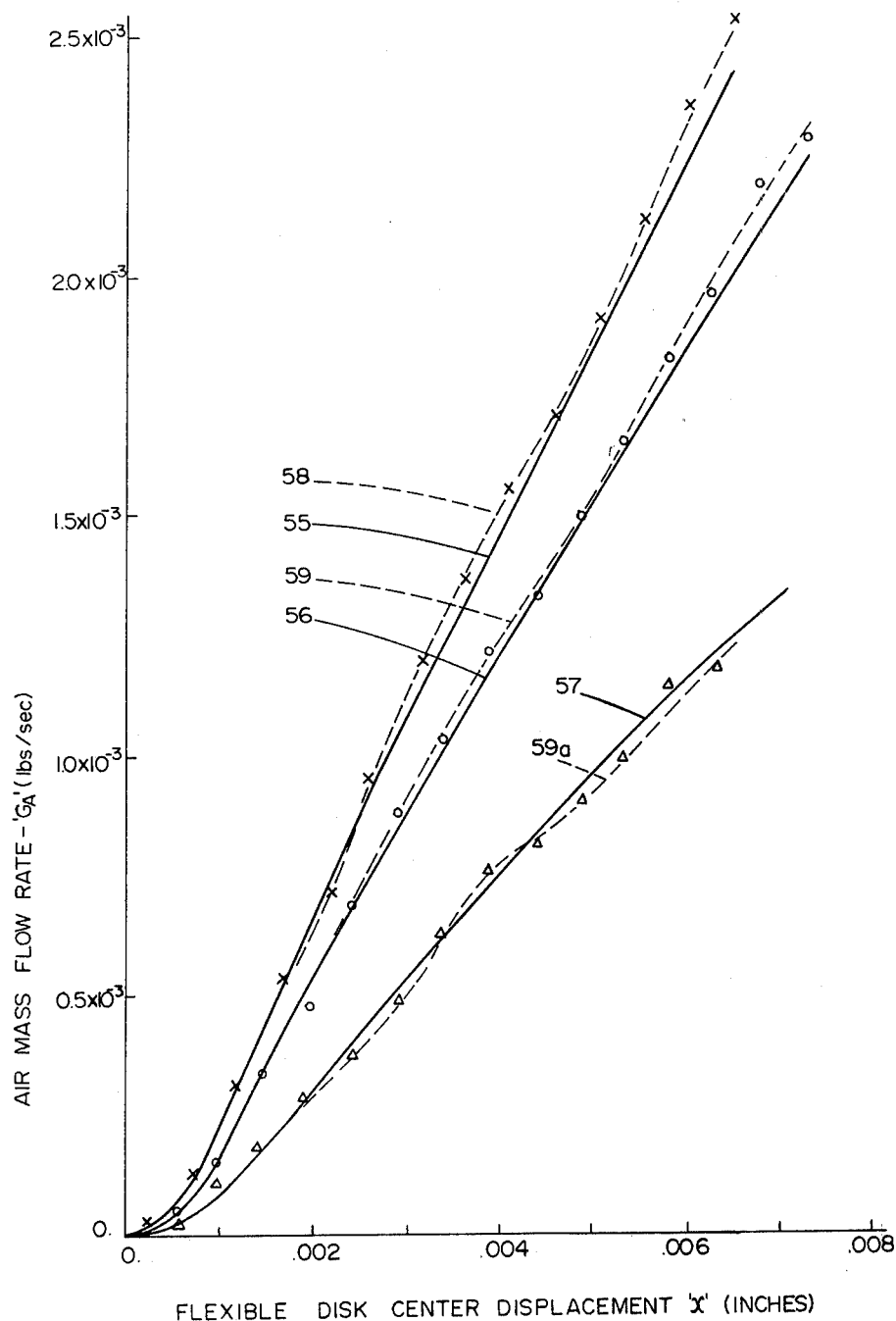
Figure 11:
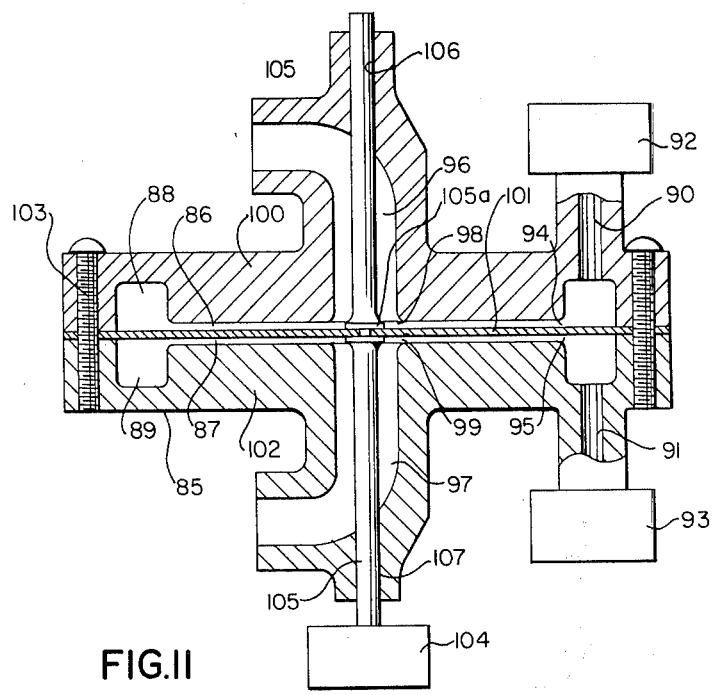
Figure 12:
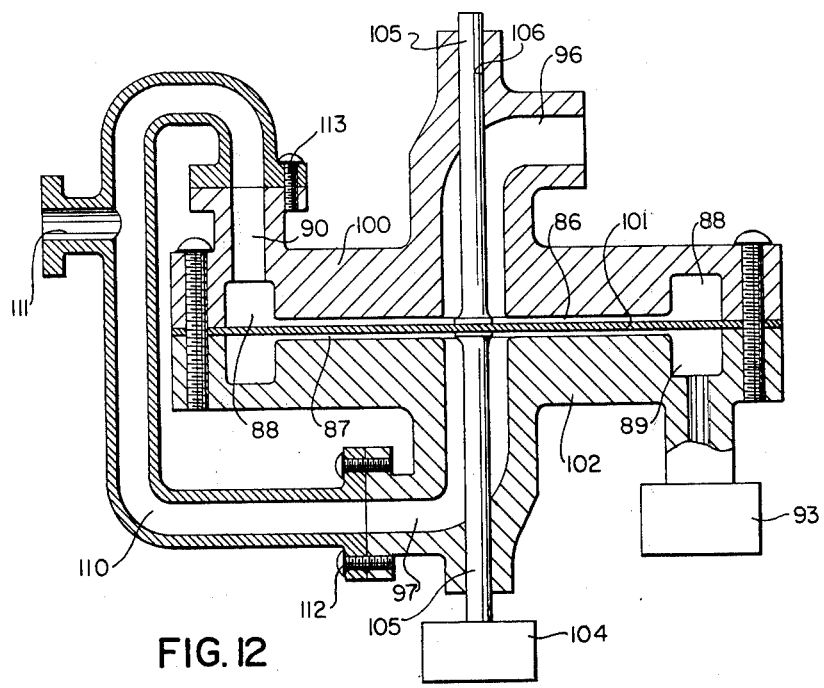
Figure 13:
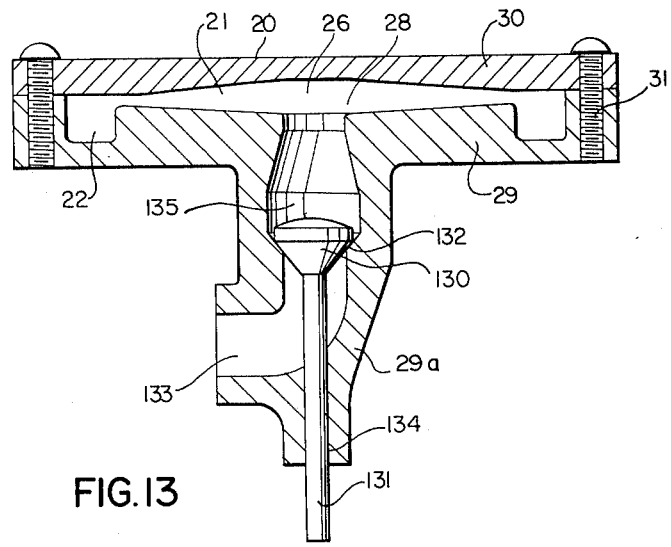
Figure 14:
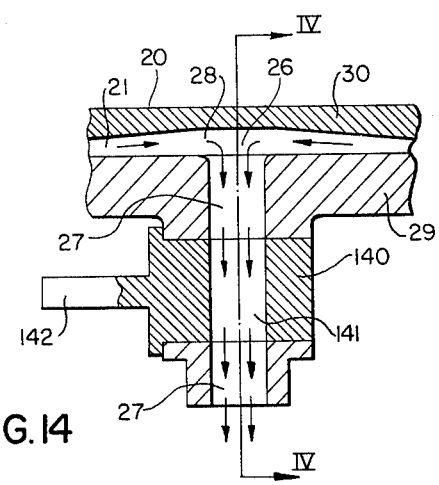
Figure 15:
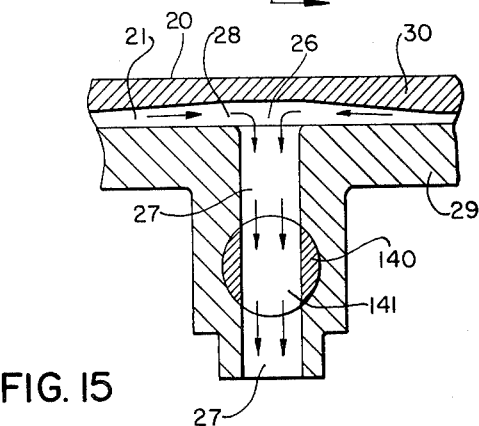
Figure 16:
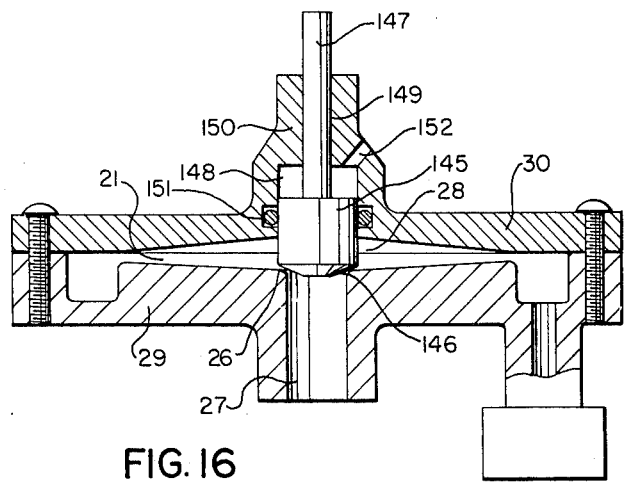
Figure 17:
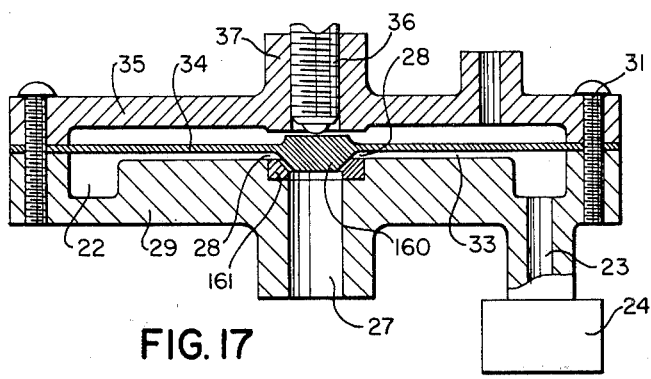
Figure 18:
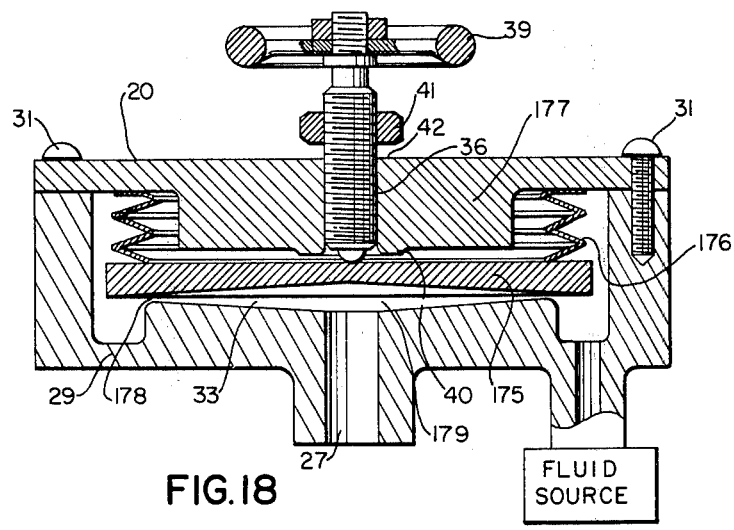
Figure 19:
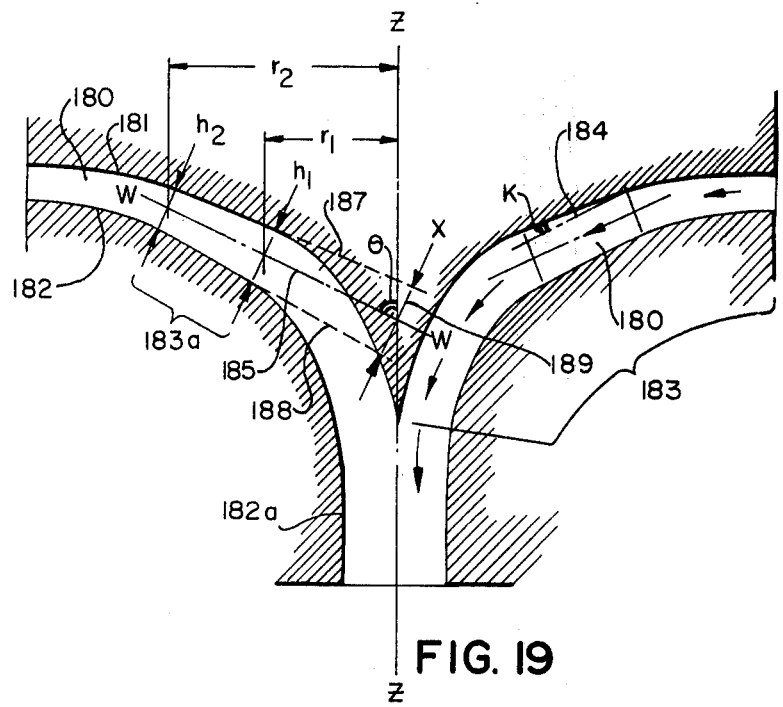
Figure 20:
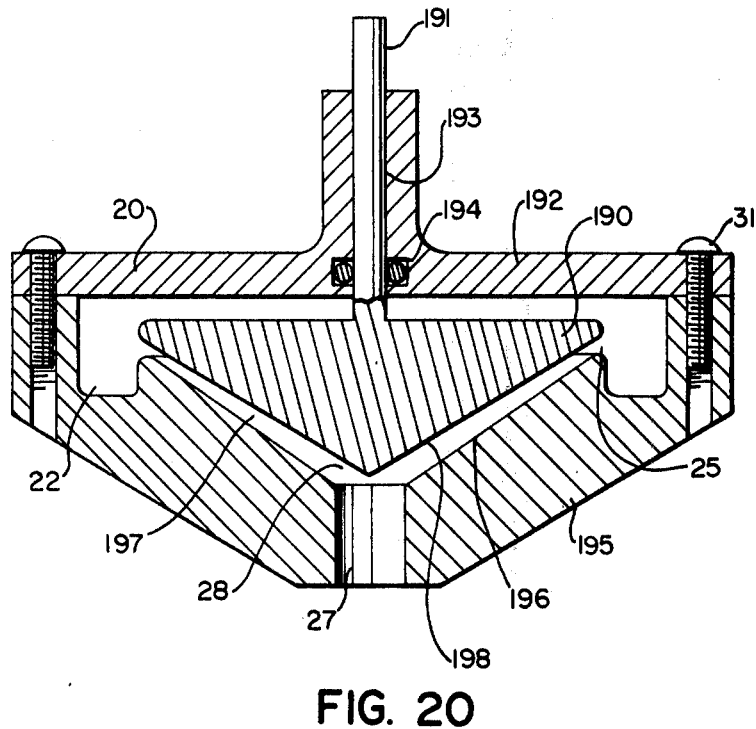
Figure 21:
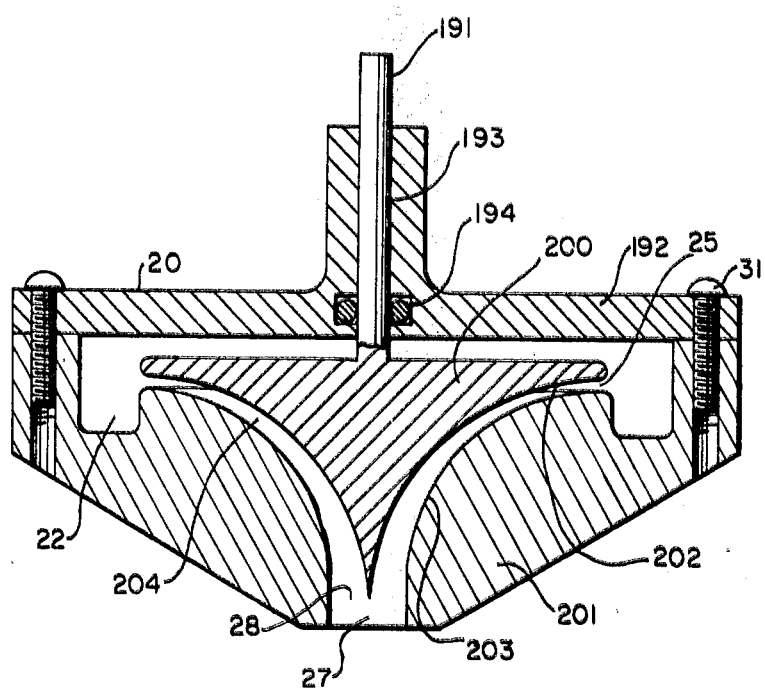
Figure 22:
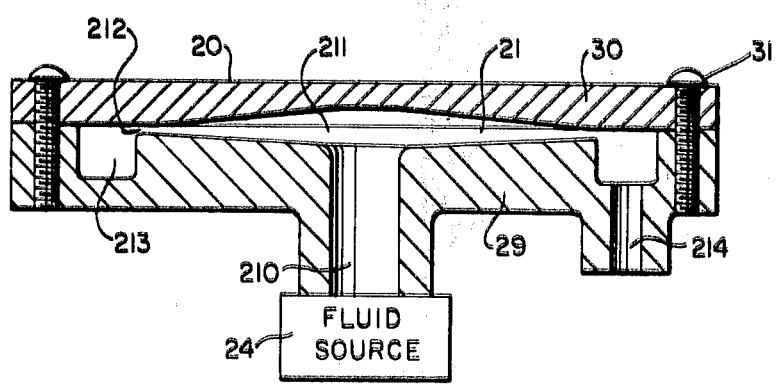

In the accompanying drawings which illustrate, by way of example, embodiments of the present invention:

FIG. 1 is a diagrammatic, sectional side view of a fixed geometry, annular shaped fluid passage, of an apparatus for regulating the flow rate of a fluid, FIG. 2 is a diagrammatic cross-section through a variable geometry, annular shaped, fluid passage of an apparatus for regulating the flow rate of a fluid, FIG. 3 is a sectional side view along II—II, FIG. 4 of an apparatus, with fixed fluid passage geometry, for regulating the flow rate of a fluid, FIG. 4 is an underside plan view of the apparatus shown in FIG. 3, with the fluid source removed, FIG. 5 is a topside plan view of an apparatus, having a flexible disc-member for the adjustment of the fluid passage geometry, for regulating the flow rate of a fluid, FIG. 6 is a sectional side view along III—III, FIG. 5 and is shown above FIG. 9, FIG. 7 is a graph showing the flow rate/passage height characteristics of an apparatus similar to that shown in FIGS. 5 and 6 when regulating the flow rate of water, as a fluid having the characteristics of a substantially incompressible, substantially Newtonian fluid, FIG. 8 is a graph showing the flow rate/passage height characteristics of an apparatus similar to that shown in FIGS. 5 and 6 when regulating the flow rate of air, as a fluid having the characteristics of a substantially compressible, substantially Newtonian fluid, FIG. 9 is a sectional side view of an apparatus, having a bellows with a rigid disk attached thereto for the adjustment of the fluid passage geometry, for regulating the flow rate of a fluid, FIG. 10 is a sectional side view of an apparatus having two flexible disc members for the adjustment of the fluid passage geometry, for regulating the flow rate of a fluid, FIG. 11 is a sectional side view of an apparatus similar to that shown in FIGS. 5 and 6 but having two annular fluid passages, FIG. 12 is a sectional side view of an apparatus similar to that shown in FIG. 11 but having a fluid interconnection and outlet port between the outlet of one fluid flow passage and the inlet to the other passage, FIG. 13 is a sectional side view of an apparatus similar to that shown in FIGS. 3 and 4 but having a poppet valve closure means within the outlet pipe, FIG. 14 is a sectional side view of a portion of an apparatus similar to that shown in FIGS. 3 and 4 but having a cylindrical plug valve closure means within the outlet pipe, FIG. 15 is a sectional side view along IV-IV, FIG. 14, FIG. 16 is a sectional side view of an apparatus similar to that shown in FIGS. 3 and 4 but having a poppet valve closure means at the annular fluid passage outlet, FIG. 17 is a sectional side view of an apparatus similar to that shown in FIGS. 5 and 6 but having a closure means at the annular fluid flow passage outlet integral with flexible disc member, FIG. 18 is a sectional side view of an apparatus similar to that shown in FIG. 9 but having the spacing between the disk plates increasing in a radially direction, and having a screw jack actuation means similar to that shown in FIG. 6, FIG. 19 is a diagrammatic, sectional side view of a fixed geometry, annular shaped fluid passage, of an apparatus for regulating the flow rate of a fluid, and wherein the fluid passage and fluid outlet in combination are funnel shaped, FIG. 20 is a sectional side view of an apparatus for regulating the flow rate of a fluid therethrough and having an adjustable but funnel shaped fluid passage with the inclined portion of the funnel shape extending along a straight path, FIG. 21 is a sectional side view of an apparatus similar to that shown in FIG. 20 but having a funnel shaped fluid passage with the inclined portion of the funnel shape extending along a curved path, and FIG. 22 is a sectional side view of an apparatus, with a fixed fluid passage geometry, similar to that shown in FIGS. 3 and 4, for regulating the flow rate of a fluid and wherein, in use, the fluid flows radially outwardly.

In FIG. 1 there is shown in a diagrammatic manner the radial cross section of an apparatus for regulating the flow rate of a fluid, comprising:

a. a casing 1 having, when the apparatus is regulating the flow rate of a fluid, a fluid passage 2 which is symmetrical about an axis ZZ, and is annular shaped when viewed in the direction of the axis ZZ and has a geometry such that any sectional area of the fluid passage 2, such as area 2a (shown dashed), which is symmetrical about the said axis ZZ and is normal to the mean direction Y for the flow of fluid therein, forms a curved surface within the range of the curved surface of a frustrum of a cone and the curved surface of a circular cylinder (in this embodiment that of a circular cylinder, an embodiment having that of a cone will be described later with reference to FIG. 19), a fluid inlet cavity 3 in the casing 1, for connection to a source (not shown) of pressurized fluid, the fluid inlet cavity 3 being coaxial with the annular shaped fluid passage 2 and forming a substantially unobstructed flow path for fluid to the whole of a peripheral inlet area to the annular shaped fluid passage 2, and fluid outlet means 5 coaxial with the annular shaped fluid passage 2 and spaced radially from the fluid inlet cavity 3, the fluid outlet means 5 being for the escape of fluid from the fluid passage 2 and forming a substantially unobstructed flow path, from the whole of a peripheral outlet area of the annular shaped fluid passage 2, for fluid which has flown radially through the annular shaped fluid passage 2 from the fluid inlet cavity 3, and wherein, b. when the apparatus is regulating the flow rate of fluid, the flow of fluid along the whole length of the fluid passage 2, and in the means direction Y of fluid flow therein, is laminar as evidenced by the fluid passage geometry conforming with the relationships in the following equations designated (1) to (8):

i. for a fluid, having the characteristics of a substantially incompressible substantially Newtonian fluid, flowing through the fluid passage 2, if the fluid passage 2 is divided into incremental portions such as portion 6 for which the centerline WW of the fluid passage 2 generally in the mean direction Y of fluid flow may be assumed to be substantially straight, then the fluid static pressure drop ($p_2 - p_1$) in each incremental portion such as portion 6 conforms with the following relationship in consistent units:

$$(p_2 - p_1) = \frac{-1.21\ G^2}{g(2\pi)^2 (\sin\theta)^2 \rho} (A) + \frac{6\mu G}{\pi \rho (\sin\theta)} (B) \quad (1)$$

where A and B are geometric parameters of the incremental portion under consideration and are defined, in consistent units, by the relationships:

$$A = \frac{k(\sin\theta)}{x^3}\left(\frac{1}{r_2} - \frac{1}{r_1}\right) + \frac{(\sin\theta)^2}{2x^2}\left[\frac{1}{(r_2)^2} - \frac{1}{(r_1)^2}\right] + \frac{k^2}{x^3}\left(\frac{1}{h_2} - \frac{1}{h_1}\right) + \frac{k^2}{2x^2}\left[\frac{1}{(h_2)^2} - \frac{1}{(h_1)^2}\right] \quad (2)$$

$$B = \frac{1}{x^3}\ln\left(\frac{r_2}{r_1}\right) - \frac{1}{x^3}\ln\left(\frac{h_2}{h_1}\right) + \frac{1}{x^2}\left(\frac{1}{h_2} - \frac{1}{h_1}\right) + \frac{1}{2x}\left[\frac{1}{(h_2)^2} - \frac{1}{(h_1)^2}\right] \quad (3)$$

where $$k = \frac{(\sin\theta)(h_1 - h_2)}{(r_2 - r_1)} \quad (4)$$

$$x = h_2 + k\left(\frac{r_2}{\sin\theta}\right) \quad (5)$$

and where, as shown in FIG. 1, $r_1$ = the radius of that incremental portion 6 at which $p_1$ occurs and where the radius is measured from the said axis ZZ of symmetry of the fluid passage to a first limit of the centerline of that incremental portion 6 of the fluid passage 2 in the mean direction Y of flow therealong, $r_2$ = the radius of that incremental potion 6 at which $p_2$ occurs and where the radius is measured from the said axis ZZ of symmetry of the fluid passage to a second limit of the centerline of that incremental portion 6 of the fluid passage 2 in the mean direction Y of fluid flow therealong and downstream of the first limit, $h_1$ = the lesser dimension of that incremental portion 6, transverse to the mean direction Y of flow of fluid therethrough, at the radius $r_1$, $h_2$ = the lesser dimension of that incremental portion 6, transverse to the means direction Y of flow of fluid therethrough, at the radius $r_2$, $\theta$ = the slope of the centerline of that incremental portion 6 in the mean direction Y of fluid flow relative to the said axis ZZ of symmetry of the fluid passage 2, and is in the range of greater than 0° and less than 180°, $k$ = means slope of one boundary wall of that incremental portion 6 relative to the opposite boundary wall thereto, where $k$ may be positive, zero, or negative, $x$ = equivalent height of that incremental portion 6 at the said axis ZZ of symmetry of the fluid passage 2 as indicated in FIG. 1 by projecting the mean slope of each of the fluid passage boundary walls of the incremental portion 6 to the said axis ZZ of symmetry, $G$ = mass flow rate of fluid flowing along the fluid passage 2, and $g$ = acceleration due to gravity, and ii. for a fluid, having the characteristics of a substantially compressible, substantially Newtonian fluid flowing, through the fluid passage 2, if the fluid passage 2 is divided into incremental portions such as portion 6 for which the centerline WW of the fluid passage 2 generally in the mean direction Y of fluid flow may be assumed to be substantially straight, and where the fluid static pressure in each incremental portion such as portion 6, at any point on the said centerline of the fluid passage 2 generally in the mean direction Y of the flow of fluid therethrough, is a substantially linear function of the radial distance from the axis ZZ of symmetry of the fluid passage, then the following relationship exists in consistent units for each incremental portion such as portion 6:

$$\frac{RT}{4}\left[(p_2)^2 - (p_1)^2\right]\left[(r_2)^2 + (r_1)^2\right] = \frac{1.21\ (GRT)^2}{g(2\pi)^2}\left[c + \frac{1}{x^2}\ln\left(\frac{p_2}{p_1}\right)\right] + \frac{6\mu G(RT)^2\ (\sin\theta)\ (D)}{\pi} \quad (6)$$

where C and D are geometric parameters of the said incremental portion under consideration and are defined, in consistent units, by the relationships:

$$C = \frac{1}{x^2}\ln\left(\frac{r_2}{r_1}\right) - \frac{2}{x^2}\ln\left(\frac{h_2}{h_1}\right) + \frac{2}{x}\left(\frac{1}{h_2} - \frac{1}{h_1}\right) - \frac{1}{2}\left[\frac{1}{(h_2)^2} - \frac{1}{(h_1)^2}\right] \quad (7)$$

$$D = \frac{x}{2k^2}\left[\frac{1}{(h_2)^2} - \frac{1}{(h_1)^2}\right] - \frac{1}{k^2}\left(\frac{1}{h_2} - \frac{1}{h_1}\right) \quad (8)$$

and where similar symbols in the relationships (6), (7) and (8) are as previously defined for the relationships (1), (2) (3), (4) and (5) and ln = hyperbolic or natural logarithim, T = the absolute temperature of fluid flowing along the fluid passage 2 where this has been found to be substantially constant along a portion of the fluid passage length, and R = a constant for the substantially compressible fluid flowing along the fluid passage 2 and is in accordance with the relationship: $p/\rho_c$ = R.T., where p = the absolute static pressure of the fluid at any position along the fluid passage 2, $\rho_c$ = the density of the compressible fluid at a position along the fluid passage where the absolute static pressure p is defined.

It will be appreciated that the static pressure drop ($p_2 - p_1$) may be evaluated from equation (6) using known numerical computational methods such as the Newton iteration method as is given in standard texts on numerical methods such as "Applied Numerical Methods" by B. Carnahan, H.A. Luther, and J.O. Wilkes, John Wiley & Sons Inc. 1969, or may be evaluated from equation (6) using other such numerical computational methods as will be known to those skilled in the art when the fluid properties, the fluid mass flow rate and the fluid passage geometry are predetermined.

The mean slope within the incremental portion 6 of the fluid passage 2, of one boundary wall relative to the opposite boundary wall, as represented in FIG. 1 by the slope k of chain-dotted line 8 relative to boundary wall 19, where the line 8 is parallel to the boundary wall 9, defines the slope k in accordance with equation (4). The intercept of the dotted lines 10 and 12 which are extensions of the boundary walls of the fluid passage 2 over the incremental length 6, with the central axis ZZ of symmetry of the fluid passage 2 defines the equivalent height X of the incremental portion 6, in accordance with equation (5). Accordingly, the fluid flow rate for any specific pressure drop through the fluid passage 2 may be computed as per equations (1) to (6) for any given fluid using the geometric parameters of the fluid passage 2 as defined in FIG. 1 and where the centerline of the incremental portion 6 of the fluid passage 2 in the mean direction of fluid flow Y may be assumed to be straight.

The mean relative slope k of one of the boundary walls within the incremental portion 6 of the passage 2 relative to the opposite boundary wall, is shown as positive in FIG. 1. However, this slope may be either positive, or zero, or negative corresponding respectively to an increasing or constant, or decreasing passage height h in the mean direction Y of fluid flow.

As shown in FIG. 1, in this embodiment the incremental portion 6 is a part of a length 4 of the fluid passage 2, all of which has a constant slope. The remaining length of the fluid passage 2 has a different slope which is also constant and so the same equations apply to this length of the fluid passage 2 with some changes in the values. The fluid passage 2 is shown in this manner in FIG. 1 to illustrate the point that different portions of the fluid passage 2 may have different slopes and that in this case the same equations apply but are calculated with some changes in the values.

In FIG. 2, similar parts to those shown in FIG. 1 are designated by the same reference numerals and the previous description is relied upon to describe them.

In FIG. 2, there are shown the geometric dimensions defined in FIG. 1 but for an incremental portion 6 of a radial cross section of an annular shaped fluid passage 2 bounded by one rigid, contoured boundary wall 13 which is again shown linearly tapered over a length 4 and has one flexible boundary wall 14 of an apparatus for regulating the flow rate of a fluid. The annular shaped fluid passage 2 is adjusted by curved surface 16, representing the surface curvature of the flexible boundary wall 14 which is in the form of a flixible disk plate, when this flexible disk plate 14 is deflected such that the height of the fluid passage 2 is varied in the means direction Y of fluid flow. The mean relative slope, within the incremental portion 6 of the fluid passage 2, is represented by the slope of straight line 18, which approximates an incremental portion of the curved surface 16 of flexible disk plate 14, over the incremental portion 6 of the fluid passage 2, relative to the rigid, linearily tapered boundary wall 13.

In the disgrammatic representation of the apparatus shown in FIG. 2, the slope $k$, as defined by equation (4) and used in equations (2), (5) and (8), is represented by the slope of the chain dotted line 17 relative to the rigid boundary wall 13 where line 17 is parallel to the boundary wall 18. In FIG. 2, the equivalent height X, as defined by equation (5) as used in equations (2), (3), (7) and (8), is represented by the intercept of chain dotted lines 10 and 12, which are extensions of the linear approximation 18 to the flexible boundary wall curved surface 16 and of the rigid boundary wall 13 respectively of the fluid passage 2 over the incremental length 6, with the central axis ZZ of symmetry.

Accordingly the fluid flow rate for any specific pressure drop through an incremental portion such as portion 6 of the fluid passage 2 may be computed as per equations (1) or (6), for any given fluid when the centerline of the incremental portion such as portion 6 generally in the mean direction of fluid flow Y may be assumed to be substantially straight. By dividing the whole length of the fluid passage 2 into incremental portions, such as portion 6, the whole length of the fluid passage 2 is defined.

It will be appreciated that the boundary wall 13 of flow passage 2, shown to be rigid and linearly tapered in FIG. 2, may be flexible and may be in the same form as boundary wall 14 shown in FIG. 2, without invalidating the flow passage geometric definitions as per FIG. 2 and equations (1) to (8) provided that both of the flexible boundary walls may be assumed to be, approximated as, linearly tapered. The means relative slope $k$ of the fluid passage boundary walls within the incremental portion 6 of the fluid passage 2, which is shown as positive in FIG. 1, as defined in accordance with equation (4), may be either positive, or zero, or negative corresponding respectively to an increasing, or constant, or decreasing passage height respectively in the mean direction Y of fluid flow.

Referring to FIGS. 3 and 4, there is shown an apparatus for regulating the flow rate of a fluid as a function of the pressure drop across the apparatus.

The apparatus shown is an elemental embodiment which exemplifies a family of valve configurations, all of which incorporate rigid members defining the boundary walls of the annular shaped fluid passage defined with reference to FIG. 1, and which shall be referred to hereinafter as nonadjustable fluid valves in that a means for altering or adjusting the internal flow passage geometry is not incorporated within the apparatus.

The apparatus is comprised of a cylindrical casing generally designated 20, having a fixed geometry, annular shaped fluid passage 21, an outer, peripheral, annular fluid inlet cavity 22 with one or more inlet connections, one being shown and designated 23, connected to a source of pressurized fluid 24 and with the inlet cavity 22 forming a substantially unobstructed flow path or fluid to the whole of an outer, peripheral inlet area 25 to the annular shaped fluid passage 21 having a geometry similar to the annular shaped fluid passage 2 of FIG. 1, and a central fluid outlet cavity 26 connecting with a fluid outlet means comprising an outlet pipe 27. The central fluid outlet cavity 26 is coaxial with the annular shaped fluid passage 21 and forms a substantially unobstructed flow path for fluid flowing radially inwardly from the whole inner periphery of the outlet area 28 of the annular shaped fluid passage 21. The cylindrical casing 20, comprises a rigid bottom disk plate 29 and rigid top disk plate 30 tightly secured to each other by means of screws 31 and if desired by suitable dowel pins (not shown) so as to define the fluid inlet cavity 22, annular fluid passage 21 and outlet cavity 26, and so as to provide a fluid-tight seal between the top and bottom disk plates 29 and 30 respectively.

It will be appreciated that the relative slope $k$ as defined with reference to FIG. 1 and equation (4) is shown as positive in FIG. 3 but that it may be either positive, zero or negative.

The apparatus has been found in practice to exhibit a useful fluid flow rate dependency upon the pressure drop across the apparatus from the outer peripheral inlet area 25 to the outlet area 28, as may be analytically predicted for the fluid flow passage 21 (FIG. 3) without recourse to empirical or experimental parameters using the relationships given in equations (1) to (5) or (4) to (8) as previously defined provided that:

i. the whole length of the annular shaped fluid passage 21 between the outer peripheral inlet area 25 and the outlet area 28 is defined in this manner, ii. the fluid has substantially the characteristics of an incompressible Newtonian fluid or a compressible Newtonian fluid, iii. the centerline of each incremental length 6 (FIG. 1) which in summation represent the whole of the fluid passage 21, (FIG. 3) generally in the mean direction of fluid flow may be assumed to be straight and the mean slope $k$ constant, as previously defined with reference to FIG. 1.

In operaion, fluid from the pressurized fluid source 24, flows into the annular fluid inlet cavity 22, radially inwards along the annular shaped fluid passage 21, and out of the apparatus via the fluid outlet cavity 26 and connecting outlet pipe 27. The flow rate of fluid through the apparatus is regulated by the static pressure drop across the fluid passage which is a combination of the pressure loss, which is directly proportional to the fluid flow rate, and which results from viscous shearing between the fluid and the walls of the annular shaped fluid passage 21, and the pressure drop which is proportional to the square of the fluid flow rate and which results from the conversion through the fluid passage 21, of the fluid static pressure to fluid dynamic pressure in accordance with the well known Bernoulli relationship. It has been found in practice that, in general, the dynamic energy or the energy associated with the velocity of the fluid at the outlet area 28 of the fluid passage 21 is not recovered by means of efficient diffusion of the fluid flow either within the outlet cavity 26 or the outlet pipe 27, but is largely dissipated by fluid viscosity effects within the flow turbulence occurring downstream of the laminar flow in the fluid passage 21.

It will be evident that with the apparatus according to the present invention, a particular degree of dominance of the viscous shearing induced pressre loss, as defined by the viscosity dependent term $$\frac{6\mu G\ (B)}{\pi \rho\ (Sin\theta)}$$

in equation (1) and in part by the viscosity dependant term $$\frac{6\mu G(RT)^2 (\sin\theta) (D)}{\pi}$$

in equation (6), relative to the induced pressure drop associated with the conversion of static to dynamic pressure as defined by the term $$\frac{-1.21 \; G^2 \; (A)}{g \; (2\pi)^2 \; (\sin\theta)^2 \rho}$$

in equation (1) and in part by the viscosity dependent term $$\frac{1.21 \; (GRT)^2}{g \; (2\pi)^2} \left[ c + \frac{1}{x^2} \ln \left( \frac{p_2}{p_1} \right) \right]$$

in equation (6) may be selected as required for a given valve application.

By way of example, should a pressurized fluid source be required to drive some load device such as a rotary hydraulic pump where the fluid flow rate to the load is required to be approximately proportional to the back pressure generated by the load, then such a fluid source could be realized using an unadjustable valve apparatus of the type described with reference in FIGS. 3 and 4, but where the fluid source 24 is pressure regulated where the annular shaped fluid passage 21 (FIG. 3) has an outer radius $r_1$ (FIG. 1) which is only moderately larger than the inner radius $r_i$, and where both the outer radius $r_o$ and the inner radius $r_i$ are very large relative to the mean distance between the boundary walls of the fluid passage 21, as given by $(h_i - h_o)/2$.

Such a valve configuraton would ensure the strong dominance of the fluid viscosity dependent terms $$\frac{6\mu G \; (B)}{\pi\rho \; (\sin\theta)}$$

in equation
(1) and $$\frac{6\mu G(RT)^2 (\sin\theta) (D)}{\pi}$$

in equation (6) and accordingly would exhibit the required fluid flow rate proportionality.

In the absence of a significant static pressure gradient in the direction of flow through the fluid passage 21, conformity with the relationships for laminar flow through the passage 21 as given by equations (1) and (6) previously defined will be limited to the local Reynolds number of the flow not exceeding 7000 for two-dimensional, closed channel flow where the Reynolds number Re is defined, in consistent units, by: Re = $h\rho U/\mu$
where
$\rho$ and $\mu$ are as previously defined and where
$h$ = local and lesser dimension of the fluid passage,
$U$ = local fluid velocity.

In the presence of a significant decreasing static pressure (i.e., total minus dynamic pressure) gradient in the direction of flow through fluid passage 21, as would be associated with accelerating flow within the passage when the flow area continually converges in the direction of fluid flow therethrough, the maintenance of laminar flow is not limited to Reynolds numbers of less than approximately 7000 as in the case of two-dimensional parallel flow, but may be extended to appreciably higher Reynolds numbers, the magnitude of which will be dependent on the static pressure gradient in the direction of flow in addition to characteristics of disturbances within the flow (i.e., disturbance wave length, intensity, etc.)

Conversely, in the presence of a significant increasing static pressure gradient in the direction of flow through the flow passage 21, as would be associated with decelerating flow within the passage when the flow area continually diverges in the direction of fluid flow therethrough, the maintenance of laminar flow is limited to Reynolds numbers substantially less than 7000 as in the case of two-dimensional, closed channel parallel flow.

In the present fluid flow rate regulating apparatus, a substantial and continuous fluid passage cross-sectional flow area reduction in the direction of fluid flow therethrough is advantageous in that such an area reduction will result in the range of laminar flow operation of the valve apparatus being considerably larger than that associated with apparatus where the fluid passage cross-sectional area is substantially constant.

However, it will be appreciated that, in embodiments of the apparatus similar to that shown in FIGS. 3 and 4, the radical direction of fluid flow therethrough may be in an outward direction as described later with reference to FIG. 22, but this outward direction of flow will substantially decrease the range of laminar flow operation relative to the range for radial inflow.

Referring to FIGS. 5 and 6, there is shown an apparatus for regulating the flow rate of a fluid as a function of the pressure drop across the apparatus and the setting of an adjustable part or parts of the apparatus. The apparatus shown in an elemental embodiment which exemplifies a family of valve configurations which are hereinafter referred to as adjustable fluid valves in that they all incorporate a flexible member or members which define at least a portion of the boundary walls of the internal fluid passage and which may be deflected or displaced by some means which is either externally or internally actuated relative to the apparatus.

In FIGS. 5 and 6, where similar parts to those shown in FIGS. 3 and 4 are designated by the same reference numerals and the previous description is relied upon to describe them, a cylindrical casing generally designated 20, is provided by a circular cover plate 35, and a rigid bottom disk plate 29. A flexible top disk plate 34 extends across the interior of the casing 20. An internal surface of rigid bottom disk plate 29 forms one of two boundary walls of an annular shaped fluid passage 33, having a geometry similar to the annular shaped fluid passage 2 of FIG. 2, which may be flat as shown in FIG. 6 or may be linearly tapered so as to form either a concave or a convex boundary wall as may be required to attain particular performance characteristics. The flexible disk plate 34, cover plate 35, and rigid bottom disk plate 29 are rigidly secured to each other in a fluidtight manner by means of screws 31, and if desired by dowel pins (not shown) so as to rigidly support the flexible disk plate 34 about its outer circumference and provide a seal between the flexible disk plate 34 and the rigid bottom disk plate 29. A means of deflecting the flexible disk plate 34 is provided to obtain a particular configuration of the annular shaped fluid passage 33 as defined with reference to FIG. 2, for the annular shaped fluid passage 2. The deflection means shown in FIG. 6 is a screw jack comprising a screw threaded member 36 rotating within a central, internally threaded, boss 37 on the circular cover plate 35, the end of the screw threaded member 36 contacting with and rotating upon a protrusion 38 located at the center and forming part of the flexible disk plate 34. The screw member 36 may be manually actuated by rotation of handle or tap 39. The deflection of the flexible disk plate 34 is mechanically limited in one direction by the constraint of a central ring protrusion 40 on the cover plate 35 contacting the surface of the protrusion 38 on the flexible disk plate 34 and is mechanically limited in the opposite direction either by the constraint of an adjustable lock nut 41 threaded onto the screw threaded member 36 contacting a shoulder 42 of the internally threaded boss 37 on the cover plate 35, or by the constraint of the flexible disk plate 34 contacting the surface of the rigid bottom plate 29. It will be appreciated that when the constraint of the flexible disk plate 34, consists of contact of that member with the rigid bottom disk plate 29, a narrow annular fluid seal will be formed at or near to the outlet area 28 of annular shaped fluid passage 33. The effectiveness of this seal is preventing the leakage of fluid from the annular shaped fluid passage 33 into the outlet pipe 27, will be dependent in part upon the relative hardness of the two contacting surfaces, upon the magnitude of the force applied to the flexible disk plate 34 by the deflecting means, and upon the relative symmetry about the centerline of the apparatus of the assembled contacting parts.

It will also be appreciated that the deflection means consisting of parts or portions thereof designated in FIG. 6 as 36, 37 and 39 may be any other force or displacement generating device or means which deflects the flexible disk plate 34 of the apparatus relative to the rigid bottom disk plate 29 such as a lever, a combination of levers, a cam, a hydraulic or pneumatic piston, a pressurized diaphragm, an electric solenoid, a rack and pinion gear, a fluid pressure supplied to the cavity 43, formed by the cover 35 and the flexible disk plate 34, through the inlet 44 when connected to a regulated source of fluid pressure or by any other means of generating displacement of the flexible disk plate 34 as may be known to those skilled in the art.

It will be appreciated that a part or all of the flexible disk plate 34 may consist of a thin sheet of metal or plastic or a laminate which, when undeflected by either a mechanical deflecting means, or by fluid pressure within the annular shaped fluid passage 33 or the cavity 43, may be flat as shown in FIG. 6 or may be contoured as required to obtain particular operational characteristics defined with reference to FIG. 2 for the annular shaped fluid passage 2.

The apparatus shown in FIGS. 5 and 6 will be recognized by those skilled in the state of the art as having, in some embodiments, the operational function of a two-port, two-way, normally-open, proportional flow control valve, and as being capable of providing this operational function as required in particular fluid system applications.

It will be appreciated that the embodiments of the apparatus described with reference to either FIGS. 3 and 4 or FIGS. 5 and 6 do not incorporate means for measuring or detecting either the pressure of the fluid within the annular fluid passage of the apparatus or the deflection or strain of the flexible disk plate member in contrast to the apparatus described in co-pending Canadian patent application Ser. No. 195,776 of Willaim F. Hayes, John W. Tanney and Helen G. Tucker, filed Mar. 22, 1974 and entitled "APPARATUS FOR MEASURING THE FLOW RATE AND/OR VISCOUS CHARACTERISTICS OF FLUIDS".

Referring now to FIGS. 7 and 8 there are shown graphs of the experimental and theoretical operating characteristics of an experimental apparatus when water (FIG. 7), which is an example of a substantially Newtonian, substantially incompressible fluid, and when air (FIG. 8), which is an example of a substantially Newtonian, substantially compressible fluid, are the test fluids, and when the configuration of the experimental apparatus is similar to that shown in FIGS. 5 and 6, and where the operation of the experimental apparatus is described using the reference numerals shown in FIGS. 5 and 6. In FIG. 7 and FIG. 8 the water mass flow rate Gw and the air mass flow rate $G_A$ are plotted against the equivalent height $x$ (FIG. 2) of the annular shaped fluid passage 33, at the central axis of symmetry ZZ (FIG. 2) of the fluid passage 33.

The annular shaped fluid passage 33 of the experimental apparatus had an innner radius ($r_i$) of 0.1 inches, an outer radius $r_o$ of 0.5 inches, and an outer radius $r_o$ passage height $h_o$ of 0.005 inches. In the experimental apparatus, the deflection of the flexible disk plate 34, was mechanically limited by the constraint of contact with the flat surface of the bottom plate 29, which formed the rigid boundary wall of the annular shaped fluid passage 33, so as to form an annular seal at the oulet area 28 of the annular shaped fluid passage 33. The flexible disk plate 34 was fabricated from nylon plastic and the rigid bottom plate 29 was fabricated from hardened Aluminum in the experimental apparatus in order to attain an effective seal at the outlet area 28.

The solid curves on the graph shown in FIG. 7 are the computed results for water in accordance with equation (1), previously given, for static pressure drop $\Delta p$ across the fluid passage 33 of the apparatus from the inlet area 25 to the outlet area 28 of 25, 20, 15, 10 and 5 pounds per square inch (p.s.i.) and are designated as curves 45, 46, 47, 48 and 49 respectively. The experimental results for water are given by the data points associated with maintaining constant each of the five specified static pressure differentials $\Delta p$ across the apparatus from the inlet cavity 22 to the exit of the outlet pipe 27, while incrementally adjusting the equivalent height $x$ of the annular shaped fluid passage as defined in FIG. 2 and measuring the water mass flow rate Gw. The experimental data points for water in FIG. 7, corresponding to the equivalent computed results of curves 45 to 49, are interconnected by smoothed dashed-line curved designated 50, 51, 52, 53 and 54 respectively.

The solid curves on the graph shown in FIG. 8 are the computed results for air in accordance with equation (6), previously given, for static pressure drop $\Delta p$ across the fluid passage 33 of the apparatus from the inlet area 25 to the outlet area 28, of 15, 10 and 4 pounds per square inch (p.s.i.) and are designated as curves 55, 56 and 57 respectively. The experimental results for air are given by the data points associated with maintaining constant each, of the three specified static pressure differentials $\Delta p$ across the apparatus from the inlet cavity 22 to the exit of the outlet pipe 27, while incrementally adjusting the equivalent height $x$ of the annular shaped fluid flow passage as defined in FIG. 2 and measuring the air mass flow rate. The experimental data points for air in FIG. 8, corresponding to the equivalent computed results of curves 55 to 57, are interconnected by smoothed dashed-line curves designated 58, 59 and 59a respectively.

It will be appreciated that, in basing the experimental data for both water and air upon the static pressure differential across the apparatus from the inlet cavity 22 to the exit of the outlet pipe 27, it is presumed that the dynamic or fluid velocity dependent pressure at the inlet area 25 to the fluid passage 33 is negligible relative to the static pressure in the inlet cavity 22 and that the fluid dynamic pressure at the outlet area 28 of the fluid passge 33 is not recovered by means of efficient diffusion of the fluid flow either within the outlet cavity 26 or the outlet pipe 27, but is totally dissipated within the flow turbulence occurring downstream of the fluid passage 33.

It can be seen from FIG. 7 and FIG. 8 that, over a substantial portion of the range of annular fluid passage equivalent height $x$ extending from zero height, there is good correlation over an appreciable range, and tolerable correlation over an extended range, between the theoretical and experimental results and an approximately proportional relationship between annular fluid passage equivalent height $x$ and both the water mass flow rate $G_w$ and the air mass flow rate $G_A$ for a given constant static pressure differential $\Delta p$ across the apparatus. Such a proportional relationship will be particularly useful in practice in the numerous applications, such as will be known to those skilled in the art, where the linearity of a fluid valve in response to its external adjustment is a performance requirement.

Further, the degree of correlation evident in FIG. 7 and FIG. 8 verifies that, in practice, the fluid dynamic pressure at the inlet area 25 to the fluid passage 33 is negligible relative to the static pressure in the inlet cavity 22 and that the fluid dynamic pressure at the outlet area 28 from the fluid passage 33 is largely dissipated by fluid viscosity effects within the outlet cavity 26 and outlet pipe 27.

Yet further, the degree of correlation evident in FIG. 7 and in FIG. 8 verifies that, in practice, the apparatus exhibits a fluid flow rate dependency upon static pressure drop and adjustable fluid passage geometry which may be analytically predicted using the relationship given in equation (1), and in equation (6) as previously defined, provided that the constraints i) to iii), previously given, with reference to the performance prediction of the embodiment of the present invention described with reference to FIGS. 1, 3 and 4, are met.

The experimental adjustable valve apparatus completely sealed the annular shaped fluid passage 21, at its outlet area 28 when the flexible disk plate 34 was deflected so as to be constrained by contact with the surface of the rigid bottom disk plate 29, as demonstrated in FIG. 7 by zero water flow rate and in FIG. 8 by zero air flow rate at zero equivalent flow passage height $x$.

The particular advantages of the present invention as compared to the many known existing devices for performing the same function of regulating the flow rate of a fluid are significant. Some of these advantages which are evident from the preceeding descriptions of two embodiments of the present invention, and which will become increasingly apparent with subsequent descriptions of further embodiments, are listed below:

1. Economical to manufacture in either small or large quantities relative to known types of fluid flow rate regulating devices exhibiting equivalent performance in that the configuration is basically simple, all of the essential geometric features of the components being axisymmetrical, the number of critical dimensional tolerances being minimal, and all of the components being readily fabricated by a number of well established techniques with a minimum of non-recurring costs.
2. Ease of disassembly and assembly of the annular shaped fluid passage defining elements facilitates inspection, cleaning, and maintenance.
3. A high tolerance to contamination of the through flowing fluid by solid matter and in particular to contamination by fibrous matter.
4. Insignificant hysteresis in the absence of sliding friction in the case of adjustable embodiments, the only hysteresis being associated with reversal of elastic deformation of the flexible disk plate member of the apparatus.
5. Capability of attaining, in the case of adjustable embodiments using a flexible disk plate, fluid flow control down to zero flow rate with insignificant fluid leakage without recourse to close component manufacturing tolerances, a feature which is particularly advantageous when the operating fluid is a gas at high pressure.
6. Fluid turbulence which may be present within the inlet cavity is substantially eliminated in the annular shaped fluid passage due to the inherent noise suppression characteristics of accelerating laminar flow.
7. Capability of attaining very rapid dynamic response in the case of adjustable embodiments in that the mass and maximum deflection of flexible disk plate of the apparatus may be conveniently designed to be very small.
8. Capability, in the case of adjustable embodiments, of attaining a close approximation to proportionality between the deflection of the flexible disk plate and the flow rate of the fluid through the apparatus over an extended range of flow rate operation by means of the appropriate selection of the annular shaped fluid passage defining dimensions.
9. Capability, in the case of unadjustable embodiments, of attaining a predetermined pressure drop/flow rate relationship, which may or may not be to or from atmospheric pressure, across the annular shaped fluid passage by the appropriate selection of the annular shaped fluid passage defining dimensions.
10. Capability of theoretically deriving the steady-state operational characteristics or transfer function directly from the geometry of the apparatus for a given operating fluid without recourse to empirical or experimental parameters or data where such transfer functions may be realistically used in fluid system simulation studies to represent the function of the apparatus.

A further embodiment of the present invention is shown in FIG. 9 where similar parts to those shown in FIGS. 5 and 6 are designated by the same reference numerals and the previous description is relied upon to describe them. In FIG. 9 there is shown the cross-section of an adjustable fluid flow valve apparatus having a cylindrical casing generally designated 20 containing a floating rigid circular disk 60, connected to the casing 20 in a fluidtight manner by a stiff bellows 61, which exhibits repeatable and reversible linear load/displacement characteristics. The casing 20 comprises a circular top cover plate 62, and a rigid bottom disk plate 29. The cover plate 62 and the bottom plate 29 are rigidly secured relative to each other and sealed in a fluidtight manner around their outer peripheral contacting surface by means of screws 31 and if desired by dowel pins (not shown). The stiff bellows 61 is secured to the floating disk 60, and to the cover plate 62 at each of its ends by any suitable attachment means such as adhesives, rivets, screws, welding, soldering, etc. so as to prevent lateral movement of the floating disk 60 relative to the bottom plate 29 while providing a spring force opposing vertical movement of the floating disk 60 along the axis of symmetry of the apparatus.

The floating disk 60, is vertically displaced relative to the bottom plate 29 so as to vary the height of the annular shaped fluid passage 33, and this is preferably done by supplying a fluid under pressure from a suitably regulated source (not shown) through an inlet 63 to the cavity 64 formed by the floating disk 60, the cover plate 62 and the bellows 61. It will be appreciated that other means of displacing the floating disk 60 could be used such as the screw jack means shown in FIG. 6, or any other means provided that such means generates a force to the floating disk which is symmetrical about the centerline of the apparatus.

Movement of the floating disk 60, is mechanically limited in one direction by the constraint of the central ring protrusion 65 on the cover plate 62, contacting the flat surface of the floating disk 60 and is mechanically limited in the opposite direction by the constraint of the rigid bottom plate 29 contacting the tapered surface of the floating disk 60. In FIG. 9, the surface of the rigid bottom disk plate 29, which forms one boundary wall of the annular shaped fluid passage 33, is shown flat while the surface of the floating disk 60, which forms the other fluid passage boundary wall, is shown linearly tapered so as to form a narrow annular seal at the outlet area 28 of annular shaped fluid passage 33, when the movement of the floating disk is constrained by contact with the bottom plate 29. However, it will be appreciated that either or both boundary walls of the annular shaped fluid passage 33 may be tapered or otherwise contoured as may be required to obtain particular operational characteristics of the apparatus while forming a fluid passage closure at the inlet area 25, at the outlet area 28 or within the annular shaped fluid passage 33 when the required fluid flow rate range therethrough extends down to zero.

Yet a further embodiment of the present invention is shown in FIG. 10, where similar parts to those shown in FIGS. 5 and 6 are designated by the same reference numerals and the previous description is relied upon to describe them. In FIG. 10 there is shown in cross-section of an adjustable fluid flow rate valve apparatus having a cylindrical casing generally designated 20 comprising an upper cover plate 71, and a lower cover plate 73. The cylindrical casing contains an upper flexible disk plate 70 and a lower flexible disk plate 72. The upper flexible disk plate 70 is rigidly secured in a fluidtight manner around its outer periphery to upper cover plate 71, and similarly the lower flexible disk plate 72 is rigidly secured in a fluidtight manner around its outer periphery to lower cover plate 73, by means of screws 74, and if desired by dowel pins (not shown) so as to provide a seal between the so secured parts. The upper cover plate 71, and the lower cover plate 73 are rigidly secured to each other in a fluidtight manner at their peripheries by means of screws 31. The location relative to each other of the upper and lower flexible disk plates 70 and 72 and the upper and lower cover plates 71 and 73 defines the fluid inlet cavity 22 and the annular shaped fluid passage 33. A means of independently deflecting the upper and lower flexible disk plates 70 and 72 is provided to obtain a particular configuration of the annular shaped fluid passage 33. Two independent deflection means shown in FIG. 10, which are similar to the deflection means shown in FIG. 6, with the exception that the screw member 75, which deflects the lower flexible disk plate 72, has a fluid passage in the form of an internal end cavity 76, and transverse ports 77, for the escape of fluid out of the apparatus from the outlet area 28 of the annular shaped fluid passage 33, via a central hole 78 in the lower flexible disk plate 72, the said screw end cavity 76, and the transverse ports 77, an outlet cavity 79 and a connecting outlet pipe 80.

It will be appreciated that provided the deflection of each of the flexible disk plates 70 and 72 is mechanically limited by contact between these plates, rather than by an adjustable lock nut 41 contacting shoulder 42 as described with reference to the apparatus shown in FIG. 6, then a fluid seal will be formed at the outlet area 28 of annular shaped fluid passage 33.

It will also be appreciated that the two independent deflection means shown in FIG. 10 may be any other means of generating axial displacement of the flexible members provided that such means allow for the escape of fluid from the outlet area 28 of the annular shaped fluid passage 33 via a substantially unobstructed flow path.

The apparatus shown in FIG. 10 will be recognized by those skilled in the art as having, in some embodiments, the operational function of a two-port, two-way, normally open, proportional flow control valve with a differential input capability in that there are two independent means of controlling the geometry of the single annular shaped fluid passage 33 such that the fluid flow characteristics of the valve will respond to either the difference or the sum of the two control inputs.

A further embodiment of the present invention is shown in FIG. 11 where there is shown the cross-section of an adjustable fluid flow valve similar to the valve shown in FIGS. 5 and 6 except that there are two annular shaped fluid passages 86 and 87, each having a geometry similar to the annular shaped fluid passage 2 of FIG. 2, one boundary wall of each of the annular shaped fluid passages 86 and 87 being defined by a common flexible disk plate 101 and the other boundary wall of each passage 86 and 87 being defined by rigid disk plates 100 and 102 respectively.

The apparatus is composed of a cylindrical casing generally designated 85, having the two annular shaped fluid passages 86 and 87, two peripheral, annular, fluid inlet cavities 88 and 89, each with one or more inlet connections, one being shown for each inlet cavity and designated 90 and 91, for connection to separate sources of pressurized fluid 92 and 93 and forming substantially unobstructed and separate flow paths for fluid to flow radially inward to the whole outer periphery of the inlet areas 94 and 95 of the two annular shaped fluid passages 86 and 87 and having two central fluid outlet pipes 96 and 97 forming substantially unobstructed and separate flow paths for fluid flowing radially inward from the whole inner peripheral outlet areas 98 and 99, of the two annular shaped fluid passages 86 and 87. The cylindrical casing 85, comprises an upper cover plate 100, and a lower cover plate 102. The plates 100 and 102 and the flexible disk plate 101, are tightly secured relative to each other in a fluidtight manner around their outer periphery by means of screws 103, and if desired by suitable dowel pins (not shown), so as to define the inlet cavities 88 and 89, and annular shaped fluid passages 86 and 87, and so as to provide a fluid seal between the flexible disk plate 101 and each of the cover plates 100 and 102. A means of deflecting the flexible disk plate 101, is provided to obtain particular and interdependent configurations of annular fluid passages 86 and 87. The deflection means shown in FIG. 11 comprises a displacement generating device 104, located externally to the casing 85, and actuating rod 105 connecting the displacement device 104 to the flexible disk plate 101. The actuating rod 105 is attached to the center of the flexible disk plate 101 by such means as rod shoulders 105a, and is slidably guided at each end by close fitting holes 106 and 107 in bosses on cover plates 100 and 102. It will be appreciated that the actuating rod may, for ease of assembly, be in two parts which are screwed together at the shoulders 105a through a central hole in the flexible disk plate 101 to clamp the flexible disk plate 101 between the shoulders 105a. It will be appreciated that the displacement generating device 104 may be a screw jack similar to that shown in FIG. 6 or in FIG. 10 or may be any other displacement generating means as will be known to those skilled in the art.

It will be evident from the operational characteristics shown in FIGS. 7 and 8 for an adjustable, single, annular shaped fluid passage valve such as shown in FIGS. 5 and 6, that each of the two outputs of the apparatus shown in FIG. 11 will exhibit approximately linear characteristics as expressed in terms of flow rate dependency upon flexible member displacement over an extended flow rate range and that the characteristic of one output will be positive (the flow rate will increase with displacement) while the characteristic of the other output will be negative (the flow rate will decrease with displacement). It will also be evident, that, provided the geometrics of the whole of the two separate internal fluid passages 86 and 87 from the fluid sources 92 and 93 to the fluid outlets 96 and 97, from the apparatus, are substantially identical when the flexible disk plate 101 is centered such that the height of each of the annular shaped passages 86 and 87 at the outlet areas 98 and 99 respectively are equal, and provided that the two fluid sources 92 and 93 are substantially identical with respect to both fluid type and pressure, then the characteristic of each of the outputs as previously defined will be of equal magnitude but of opposite sign.

It will be appreciated that provided the deflection of the flexible disk plate 101 is mechanically limited by contact with the cover plates 100 and 102, as described with reference to the apparatus shown in FIG. 6, then a fluid seal may be formed at the outlet area 98 or the outlet area 99 of the annular shaped fluid passages 86 or 87 respectively.

It will be recognized by those skilled in the art that the apparatus shown in FIGS. 11 may have the operational function of one three-port, three-way, proportional flow value, provided that the fluid source supplying the peripheral inlet cavity to one of the two annular shaped fluid passages is replaced by a substantially unobstructed fluid flow channel connected to the outlet pipe from the annular shaped fluid passage and that an additional pipe is provided in the connecting fluid flow channel for the flow of fluid to or from the connecting fluid flow channel.

Such a three-way value configuration is shown in FIG. 12, where similar parts to those shown in FIG. 11 are designated by the same reference numerals and the previous description is relied upon to describe them. In FIG. 12, a fluid flow channel 110 is connected and sealed at one of its ends to outlet pipe 97 by such means as screws 112 and the other of its ends to inlet connection 90 which connects with peripheral, annular fluid inlet cavity 88 by such means as screws, one of which is shown and designated 113. In FIG. 12, a port 111 is connected to the fluid flow channel 110, for the flow of fluid to or from the fluid flow channel 110.

In operation, the apparatus shown in FIG. 12 has the port 111 connected to a suitable load device (not shown), such as to one side of a spring-loaded linear piston actuator, and outlet pipe 96 is arranged to exhaust fluid to an ambient reference pressure such as a reservoir tank (not shown), in the case of a liquid, or to the atmosphere in the case of air or any other expendable gas. Fluid from the pressurized fluid source 93, flows into fluid inlet cavity 89, radially inwards along the annular shaped fluid passage 87, out of the annular shaped fluid passage 87 via outlet pipe 97 connected to flow channel 110, into or out of the load device connected to port 111, into fluid inlet cavity 88, radially inwards along the annular shaped fluid passage 86, and out of the apparatus via outlet pipe 96. Accordingly, movement of the flexible disk plate 101 by means of displacement device 104, will alter the pressure drop across each of the two annular shaped fluid passages 86 and 87 in accordance with the interdependency previously described with reference to FIG. 11 such that the pressure delivered to the load device connected to port 111, will be variable between the limits of the fluid source pressure and the fluid outlet exhaust pressure, the said pressure limits corresponding to the closure of either of the annular shaped fluid passages 86 and 87 respectively.

It will be appreciated that the apparatus shown in FIG. 12 exhibits operational characteristics similar to those of an underlapped three-way spool valve as given in many standard texts on fluid power and servo-valves such as described on page 69 of the text by D. McEloy and H.R. Martin entitled "The Control of Fluid Power", published by Longman, 1973. in this regard, it will be evident that the apparatus shown in FIG. 12 will exhibit the finite null leakage fluid flow rate feature of the analogous underlapped spool valve, in that a continuous flow of fluid from the source 93 to the exhaust outlet 96 is required to maintain a steady-state pressure between the limits of the inlet source pressure and the outlet exhaust pressure at the port 111 connected to the load device as may be deduced from the application of equations (1) or (6) given previously, to the three-way valve embodiment shown in FIG. 12.

It will be further appreciated that two three-way valves, each having embodiments such as shown in FIG. 12, may be interconnected by means of suitable fluid flow channels or pipes so as to function as a single four-port, four-way, proportional valve which will exhibit operational characteristics which may be deduced from those of the three-way valve as previously described.

Referring now to FIG. 13, there is shown a cross-sectional side view of an apparatus similar to that shown in FIGS. 3 and 4, where similar parts to those shown in FIGS. 3 and 4 are designated by the same reference numerals, and the previous description is relied upon to describe them. In FIG. 13, there is the addition of a closure means comprising a conical plug 130 mounted on the end of a supporting shaft 131, a valve seat 132 in outlet passage 135 and connecting outlet pipe 133 which allow fluid to escape from the appartus. A supporting shaft 131 for the plug 130 is slidably located in and guided by a bore 134 in an extension 29a to the disk plate 29 which defines the outlet passage 135 and outlet pipe 133, and is free to slide longitudinally along the axis of the hole 134. Opening of the closure means by appropriate longitudinal movement of shaft 131 and plug 130 relative to the bottom disk plate 29 allows fluid from the thin annular passage 21, to flow out of the apparatus through outlet 133, via the annular gap so formed between the conical surface of the plug 130 and the valve seat 132. Closing of the said closure means by appropriate longitudinal movement of shaft 131 and attached plug 130, prevents fluid within the annular shaped fluid passage 21, from flowing out of the apparatus through outlet 133, in that the plug 130 is firmly seated on the valve seat 132. Intermediate positioning of the plug 130, between the open and closed positions described above provides for intermediate throttling control of the fluid flow through the apparatus.

In FIGS. 14 and 15 there is shown, in part, two perpendicular radial cross-sectional views of an embodiment of the apparatus similar to that shown in FIG. 3 and 4 and similar parts to those in FIG. 3 and 4 are designated by the same reference numerals and the previous description is relied upon to describe them.

In FIGS. 14 and 15, a cylindrical plug 140 is located within the outlet pipe 27 such that the plug centerline is perpendicular to the outlet pipe centerline. A circular passage 141 having substantially the same internal diameter as the outlet pipe 27 is located in plug 140 such that when the plug is rotated by means of a shaft 142, the passage 141 is aligned with the bore of the outlet pipe 27, as shown in FIGS. 14 and 15, and a substantially unobstructed fluid passage is provided for the escape of fluid from the apparatus. It will be evident from FIGS. 14 and 15, that a ninety degree rotation of plug 140 will close off the outlet pipe 27. Intermediate rotation of the plug 140 by means of shaft 142 between the open position shown in FIGS. 14 and 15 and the closed position provides for intermediate throttling control of the fluid flow through the apparatus.

It will be appreciated that the fluid flow mechanical closure means within the outlet pipe 27 may be a poppet valve as shown in FIG. 13, a cylindrical plug valve as shown in FIGS. 14 and 15, or any other known type of proportional or incremental type of fluid valve. It will be further appreciated that such mechanical closure means may be located within the outlet pipe of the apparatus as shown in FIG. 13, and in FIGS. 14 and 15, or may be located within the inlet pipe of the apparatus between the fluid source and the annular, peripheral inlet cavity, or may be located between the annular shaped fluid passage and the outlet pipe.

By way of example, a poppet valve type of mechanical closure means is shown in FIG. 16 located in the outlet cavity between the annular shaped fluid passage 21 and the outlet pipe 27 of a nonadjustable embodiment of the apparatus similar to the embodiment shown in FIGS. 3 and 4. In FIG. 16, similar parts to those shown in FIGS. 3 and 4 are designated by the same reference numerals and the previous description is relied upon to describe them. The mechanical closure means is within an outlet cavity 26 and comprises a cylindrical plug 145 with a conical end seat 146, mounted on the end of a supporting shaft 147, and forming a seal with the fluid flow passage boundary wall, defined by the rigid bottom disk plate 29, at the outlet end 28 of the annular shaped fluid passage 21. The plug 145 and the supporting shaft 147 are located within and guided by bores 148 and 149 respectively in a boss extension 150 to the rigid top disc plate 30. A suitable fluid seal such O ring seal 151 prevents fluid from escaping from the apparatus between plug 145 and bore 148 via vent hole 152. Opening of the closure means is caused by longitudinal movement of shaft 147 and attached plug 145 relative to the bottom disk plate 29, and this allows fluid from the annular shaped fluid passage 21, to flow out of the apparatus through outlet pipe 27 via the annular gap so formed between the conical end 146 of plug 145 and the seat formed by the intersection of annular shaped fluid passage 21 and outlet pipe 27. Closing of the outlet cavity closure means, by appropriate longitudinal movement of shaft 147 and attached plug 145, prevents fluid within the annular shaped fluid passage 21 from flowing out of the apparatus through outlet 27. Intermediate positioning of the plug 145, between the open and closed position described above provides for intermediate throttling control of the fluid flow through the apparatus.

A further embodiment of the present invention is shown in FIG. 17 where similar parts to those shown in FIGS. 5 and 6 are designated by the same reference numerals, and the previous description is relied upon to describe them.

In FIG. 17 there is shown, in part, a radial cross-sectional side view of an apparatus similar to that shown in FIG. 6, except that there is a mechanical closure means comprising a cone shaped protrusion 160 centrally located on the lower surface of flexible member 34 and a correspondingly shaped seat 161 located at the intersection of the internal fluid flow boundary walls formed between the outlet area 28 of the annular shaped fluid passage 33 and the entrance into outlet pipe 27. It will be appreciated that the seat 161 may be an insert in a recess in the rigid disk plate 29, as shown in FIG. 17, or may be integral with the rigid disk plate 29. Also the protrusion 160 on the flexible member 34 may integral with that member as shown in FIG. 17, or may be attached to or inserted in that member by any suitable fixing means such as a adhesive, screws, or press fit.

In FIG. 17, downward deflection of the flexible member 34 by means of rotating the screw jack member 36 will displace the protrusion 160 relative to the seat 161 until contact between the protrusion 160 and the seat forms a closure at the outlet end 28 of annular shaped fluid passage 33. It will be appreciated that such closure means as is shown in FIG. 17 will operate in conjunction with variations in the geometry of the annular shaped fluid passage 33 and not function independently as in the case of the closure means shown in FIG. 13, in FIGS. 14 and 15, and in FIG. 16. It will be further appreciated that such closure means as is shown in FIG. 17 will generally exhibit operating characteristics differing appreciably from those shown in FIG. 7 and FIG. 8 for an apparatus similar to that shown in FIGS. 5 and 6 in that closure of the fluid passage 33 of the apparatus shown in FIG. 17 does not necessarily need to correspond to a tapering annular shaped fluid passage radial cross-section with zero passage height at the outlet area 28.

A further embodiment of the present invention is shown in FIG. 18 where similar parts to those shown in FIGS. 5 and 6 are designated by the same reference numerals and the previous description is relied upon to describe them. In FIG. 18 there is shown the cross-section of an adjustable fluid flow valve apparatus where the casing, generally designated 20, comprises a circular, rigid top plate 177 and a rigid bottom disk plate 29. The top plate 177 and the bottom plate 29 are rigidly secured in a fluidtight manner relative to each other and sealed around their outer peripheral contacting surface by means of screws 31 and if desired by dowel pins (now shown) or by any other suitable means. A bellows 176 is secured and sealed to a floating, rigid, circular disk 175 and to the top plate 177 at each of its ends by suitable attachment means such as adhesives, rivets, screws, welding, soldering etc. so as to prevent leakage of fluid out of the casing 20 other than via the outlet pipe 27.

The floating disk 175 is vertically displaced relative to the bottom plate 29 so as to vary the height of the annular shaped fluid passage 33 by means of the screw jack 36, which may be manually actuated by rotation of the handle 39. The movement of the disk plate 175 is mechanically limited by a central ring protrusion 40 on the top plate 177 contacting the surface of the floating disk 175 and is mechanically limited in the opposite direction either by the constraint of an adjustable lock nut 41, threaded onto the screw member 36, contacting the shoulder 42 of the top plate 177 or by the disk plate 175 contacting the surface of the rigid bottom plate 29.

It will be appreciated that the deflection means 36 and 39 in FIGS. 17 and 18 may be replaced by any other force or displacement generating device or means which moves the rigid movable disk plate 175 relative to the rigid disk plate 29, such as a lever, a combination of levers, a cam, a hydraulic or pneumatic piston, a pressurized diaphram, an electric solenoid, a rack and pinion or by any other known means of generating a force or displacement.

In FIG. 18 the surface of the rigid bottom disk plate 29 which forms one flow passage boundary wall is shown linearly tapered as is the disk 177 so as to form a narrow annular seal at the inlet end 178 of the annular shaped fluid passage 33 when the movement of the disk 175 is constrained by the bottom disk plate 29. However, it will be appreciated that either or both boundary walls of the annular shaped fluid passage 33 may be otherwise contoured or tapered as may be required to obtain particular operational characteristics of the apparatus while forming a fluid passage seal at the inlet area 178, at the outlet area 179, or within the fluid passage when the required fluid flow rate range extends down to zero.

Referring now to FIG. 19, there is shown in a diagrammatic manner the geometric dimensions, previously defined with reference to FIG. 1 of a radial cross-section of a designated portion of the annular shaped fluid passage, as defined by a portion of two rigid boundary walls forming a funnel shaped annular fluid passage of an apparatus according to the present invention for regulating the flow rate of a fluid.

In FIG. 19, the funnel-shape of the annular shaped fluid passage 180 is symmetrical about the axis ZZ and is defined by the two rigid passage boundary walls represented by the curved lines 181 and 182, the entire length of the fluid 30 passage 180 is designated by 183 through which laminar flow is maintained, and for an incremental portion 183a the centerline W—W of the passage 180 in the general direction of fluid flow Y therealong is assumed to be substantially straight. The boundary wall of the outlet means from the annular shaped fluid passage 180 is represented by the extension 182a of boundary wall 182 beyond the termination of boundary wall 181 in the general direction of fluid flow Y therealong. The mean relative slope, of the incremental portion 183a of the two passage defining boundary lines 181 and 182 is represented by slope $k$ of chain-dotted line 184 in accordance with equation (4) for $k$ which has been previously defined. The inclination of the centerline 185 of the incremental portion 183a in the direction of fluid flow therealong relative to the axis ZZ of symmetry of the annular shaped fluid passage 180 is represented by the angle $\theta$. The intercept of the dotted lines 187 and 188, which are extensions of the boundary walls 181 and 182 respectively over the incremental portion 183a, with a line 189 which is perpendicular to the centerline 185 of the incremental portion 183a and which passes through the intersection of that centerline with the axis of symmetry ZZ of the annular shaped fluid passage 180, defines the geometric parameter x in accordance with the previously defined equation (5).

Accordingly, the fluid flow rate for any specific pressure drop through the annular shaped fluid passage 180, may be computed by the successive incremental application of equations (1) to (3) or (6) to (8) over the entire length 183 of the fluid passage 180 for any given fluid using the passage geometric parameters defined in FIG. 18 when the centerline of each incremental portion 183a in the mean direction of fluid flow may be assumed to be straight. The inclination $\theta$ of the centerline 185, over each incremental portion of the fluid passage 180 relative to the axis of symmetry ZZ of the annular shaped fluid passage 180, must be in the range greater than 0° and less than 180° for equations (1), (2), (4), (5) and (6) to be meaningful. The mean relative slope $'k'$ of the passage boundary walls within the incremental portion 183a which is shown as positive in FIG. 18, in accordance with the defining equation (4) may be either positive, zero, or negative corresponding respectively to an increasing or constant or decreasing passage height respectively in the direction of decreasing radius of the annular shaped fluid passage.

A further embodiment of the present invention is shown in FIG. 20, where similar parts to those shown in FIGS. 5 and 6 are designated by the same reference numerals and the previous description is relied upon to describe them. In FIG. 20 there is shown the cross-section of an adjustable fluid flow valve apparatus where the casing, generally designated 20 with a movable conical member 190 and a shaft 191 rigidly attached to the movable conical member 190. The casing 20 comprises a circular top cover plate 192, having a guide 193 for the shaft 191 and a seal 194 to prevent the leakage of fluid between the shaft 191 and guide 193, and a rigid bottom plate 193. The cover plate 192 and the bottom plate 195 are rigidly secured relative to each other and sealed around their outer peripheral contacting surface by means of screws 31 and if desired by dowel pins (not shown) or by any other suitable means so as to define fluid inlet cavity 22 which is connected to a suitable fluid source (not shown). The bottom plate 195 is tapered along its upper surface 196 and the conical member 190 is tapered along its lower surface 198 to form an annular and funnel shaped fluid passage 197, having a geometry related to the annular shaped fluid passage 180 of FIGS. 19, with inlet area 25 and outlet area 28. Outlet pipe 27 connecting with the fluid passage outlet area 28 is provided in bottom plate 195 for the escape of fluid from the fluid passage 197.

The conical member 190 is vertically displaced relative to the bottom plate 195 so as to vary the height of the annular and funnel shaped fluid passage 197 by means of the shaft 191 which may be driven by a screw jack or any similar device or means which translates the conical member 190 relative to the bottom plate 195 such as a lever, a combination of levers, a cam, a hydraulic or pneumatic piston, a pressurized diaphram, an electric solenoid, a rack and pinion or by any other known means of generating a displacement.

In FIG. 20 the surfaces 196 and 198 bounding the fluid passage 197 are such that when the conical member 190 is brought into contact with the bottom plate 195 by means of displacement of the shaft 191 a thin annular seal is formed at the inlet area 25 of the annular shaped fluid passage 197.

However, it will be appreciated that either or both boundary walls 196 and 198 of the annular shaped fluid passage 197 may be otherwise tapered or contoured such as shown in FIG. 19 as may be required to obtain particular operational characteristics of the apparatus while obtaining acceptable fluid sealing of the annular shaped fluid passage 197, at an appropriate radial location between the fluid passage inlet 25 and outlet 28, when the fluid flow rate range is required to extend to zero.

Such otherwise contoured boundary walls of the annular shaped fluid passage are described with reference to a further embodiment of the present invention which is shown in FIG. 21 where similar parts to those shown in FIG. 20 are designated by the same reference numbers and the previous description is relied on to describe them. In FIG. 21 there is shown the cross-section of an adjustable fluid flow valve apparatus where the cylindrical casing generally designated 20 contains a movable member 200 and a shaft 191 rigidly attached thereto. The casing 20 comprises a circular top plate 192 and a rigid bottom plate 210 which are secured together in the same manner as described with reference to top and bottom plates 192 and 195 shown in FIG. 20. The movable member 200 is contoured along its lower surface 202 and the bottom plate is contoured along its upper surface 203 to form an annular shaped fluid passage 204, having a geometry similar to the annular shaped fluid passage 180 shown in FIG. 19, such that the previously defined angle $\theta$ shown in FIG. 19, varies continuously over the length of the annular shaped fluid passage 204, within the limits defined above with reference to FIG. 19.

It will be appreciated that in other embodiments of the invention using the apparatus previously described with reference to FIGS. 3 to 6, FIGS. 8 to 18, and FIGS. 20 to 22 inclusive, the radial direction of fluid flow therethrough may be in an outward direction, provided that the previously defined annular shaped fluid passage geometry limitations associated with the application of equations (1) to (3) and (6) and (8) are satisfied. By way of example, there is shown in FIG. 22 the cross-section of an apparatus similar to that shown in FIG. 3, where similar parts to those shown in FIG. 3 are designated by the same reference numerals. In FIG. 22, the source of pressurized fluid 24, is connected to axial inlet pipe 210, forming a substantially unobstructed flow path for fluid to flow radially outward through the annular shaped fluid passage 21 from the whole inner, peripheral inlet area 211 of the annular shaped fluid passage 21, to the whole outer, peripheral outlet area 212, of the annular shaped fluid passage 21 which, in turn, is connected to a peripheral annular fluid outlet cavity 213. The outlet cavity 213 is connected to one or more outlet pipes 214 for the escape of fluid therefrom.

We claim:

1. Apparatus for regulating the flow rate of a fluid, comprising;
   a. a casing having, when the apparatus is regulating the flow rate of a fluid, a fluid passage which is symmetrical about an axis and is annular shaped when viewed in the direction of the said axis and has a geometry such that any sectional area of the fluid passage which is symmetrical about the said axis and is normal to the mean direction for the flow of fluid therein forms a curved surface within the range of the curved surface of a frustrum of a cone and the curved surface of a circular cyliner, a fluid inlet cavity in the casing, for connection to a source of pressurized fluid, the fluid inlet cavity being coaxial with the annular shaped fluid passage and forming a substantially unobstructed flow path for fluid to the whole of a peripheral inlet area to the annular shaped fluid passage, and fluid outlet means coaxial with the annular shaped fluid passage and spaced radially from the fluid inlet cavity, the fluid outlet means being for the escape of fluid from the fluid passage and forming a substantially unobstructed flow path, from the whole of a peripheral outlet area of the annular shaped fluid passage, for fluid which has flown through the annular shaped fluid passage from the fluid inlet cavity, and wherein,
   b. when the apparatus is regulating the flow rate of a fluid, the flow of fluid along the whole length of the fluid passage, and in the mean direction of fluid flow therein, is laminar as evidenced by the fluid passage geometry conforming with the relationships in the following equations designated (1) to (8):

i. for a fluuid, having the characteristics of a substantially incompressible, substantially Newtonian fluid, flowing through the fluid passage, if the fluid passage is divided into incremental portions for which the centerline of the fluid passage generally in the mean direction of the fluid flow may be assumed to be substantially straight, then the fluid static pressure drop $(p_2 - p_1)$ in each incremental portion conforms with the following relationship in consistent units:

$$(p_1 - p_2) = \frac{-1.21 G^2}{g(2\pi)^2 (\sin\theta)^2 \rho} (A) + \frac{6\mu G (B)}{\pi \rho (\sin\theta)} \quad (1)$$

where A and B are geometric parameters of the incremental portion under consideration and are defined, in consistent units, by the reltionships:

$$A = \frac{k(\sin\theta)}{x^3}\left(\frac{1}{r_2} - \frac{1}{r_1}\right) + \frac{(\sin\theta)^2}{2x^2}$$

$$\left[\frac{1}{(r_2)^2} - \frac{1}{(r_1)^2}\right] + \frac{k^2}{x^3}\left(\frac{1}{h_2} - \frac{1}{h_1}\right)$$

$$+ \frac{k^2}{2x^2}\left[\frac{1}{(h_2)^2} - \frac{1}{(h_1)^2}\right] \quad (2)$$

$$B = \frac{1}{x^3}\ln\left(\frac{r_2}{r_1}\right) - \frac{1}{x^3}\ln\left(\frac{h_2}{h_1}\right)$$

$$+ \frac{1}{x^2}\left(\frac{1}{h_2} - \frac{1}{h_1}\right)$$

$$+ \frac{1}{2x}\left[\frac{1}{(h_2)^2} - \frac{1}{(h_1)^2}\right] \quad (3)$$

$$\text{where } k = \frac{\sin\theta\,(h_1 - h_2)}{(r_2 - r_1)} \quad (4)$$

$$\text{and } x = h_2\,k\,\frac{r_2}{\sin\theta} \quad (5)$$

and where $r_1$ = the radius, of that incremental portion at which $p_1$ occurs and where the radius is measured from the said axis of symmetry of the fluid passage to a first limit of the centerline of that incremental portion of the fluid passage in the mean direction of flow therealong, $r_2$ = the radius of that incremental portion at which $p_2$ occurs and where the radius is measured from the said axis of symmetry of the fluid passage to a second limit of the centerline of that incremental portion of the fluid passage in the mean direction of fluid flow therealong and downstream of the first limit, $h_1$ = the lesser dimension of that incremental portion, transverse to the mean direction of flow of fluid therethrough, at the radius $r_1$, $h_2$ = the lesser dimension of that incremental portion, transverse to the mean direction of flow of fluid therethrough, at the radius $r_2$, $\theta$ = the slope of the centerline of that incremental portion in the mean direction of fluid flow relative to the said axis of symmetry of the fluid passage, and is in the range greater than 0° and less than 180°, $k$ = mean slope of one boundary wall of that incremental portion relative to the opposite boundary wall thereto, $x$ = equivalent height of that incremental portion at the said axis of symmetry of the fluid passage as indicated by projecting the mean slope of each of the fluid passage boundary walls of that incremental portion to the said axis of symmetry, $G$ = mass flow rate of fluid flowing along the fluid passage, $\rho$ = density of fluid flowing along the fluid passage, $\mu$ = absolute viscosity of fluid flowing along the fluid passage, and $g$ = acceleration due to gravity, and ii. for a fluid, having the characteristics of a substantially compressible, substantially Newtonian fluid, flowing through the fluid passage, if the fluid passage is divided into incremental portions for which the centerline of the fluid passage generally in the mean direction of fluid flow may be assumed to be substantially straight, and where the fluid static pressure in each incremental portion, at any point on the said centerline of the fluid passage in the mean direction of flow of fluid therethrough, is a substantially linear function of the radial distance from the said axis of symmetry of the fluid passage to that point on the said centerline of the fluid passage, then the following relationship exists in consistent units for each incremental portion:

$$\frac{RT}{4}\left[(p_2)^2 - (p_1)^2\right]\left[(r_2)^2\,(r_1)^2\right]$$

$$= \frac{1.21\,(GRT)^2}{g(2\pi)^2}\left[C + \frac{1}{x^2}\ln\left(\frac{p_2}{p_1}\right)\right]$$

$$+ \frac{6\mu G(RT)^2\,(\sin\theta)\,(D)}{\pi} \quad (6)$$

where C and D are geometric parameters of the inremental portion under consideration and are defined, in consistent units, by the relationships:

$$C = \frac{1}{x^2}\ln\left(\frac{r_2}{r_1}\right) - \frac{2}{x^2}\ln\left(\frac{h_2}{h_1}\right)$$

$$+ \frac{2}{x}\left(\frac{1}{h_2} - \frac{1}{h_1}\right) - \frac{1}{2}\left[\frac{1}{(h_2)^2} - \frac{1}{(h_1)^2}\right] \quad (7)$$

$$D = -\frac{x}{2k^2}\left[\frac{1}{(h_2)^2} - \frac{1}{(h_1)^2}\right]$$

$$- \frac{1}{k^2}\left[\frac{1}{h_2} - \frac{1}{h_1}\right] \quad (8)$$

and where similar symbols in the relationships (6), (7) and (8) are as previously defined for the relationships (1), (2) (3), (4) and (5) and where $\ln$ = hyperbolic or natural logarithm, $T$ = the absolute temperature of fluid flowing along the fluid passage, which with the fluid passages according to the present invention has been found to remain substantially constant along the whole length of the fluid passage, and $R$ = a constant for the substantially compressible fluid flowing along the fluid passage and is in accordance with the relationship $p/p_c = R.T.$ where $p$ = the absolute static pressure of the fluid at any position along the fluid passage, $\rho_c$ = the density of the substantially compressible fluid at the position along the fluid passage where the absolute static pressure p is defined.

2. Apparatus according to claim 1, wherein the fluid inlet passage forms a substantially unobstructed flow path to the whole of an outer, peripheral inlet area to the annular shape of the fluid passage.

3. Apparatus according to claim 1, wherein the fluid inlet passage forms a substantially unobstructed flow path to the whole of an inner, peripheral inlet area to the annular shape of the fluid passage.

4. Apparatus according to claim 1, further comprising a fluid closure means upstream of the annular shaped fluid passage.

5. Apparatus acccording to claim 1, further comprising a fluid closure means downstream of the annular shaped fluid passage.

6. Apparatus according to claim 1, further comprising a member in the casing moveable along the axis of symmetry and forming one moveable member in the casing for adjusting the fluid passage to the said fluid passage geometry.

7. Apparatus according to claim 6, wherein the means for adjusting the moveable member is capable of moving the said member sufficiently to close the fluid passage in a fluidtight manner.

8. Apparatus according to claim 1, further comprising a flexible disk in the casing sealed around the periphery thereof to the casing and forming one boundary wall of the fluid passage, and means for deflecting the flexible disk to obtain the said fluid passage geometry.

9. Apparatus according to claim 8, wherein the means for deflecting the flexible disk is capable of deflecting the flexible disk sufficiently to close the fluid passage in a fluidtight manner.

10. Apparatus according to claim 1, further comprising two flexible disks in the casing with the periphery of each flexible disk sealed to the casing, each flexible disk forming one of the boundary walls of the fluid passage, and means for deflecting the flexible disks to obtain the said fluid passage geometry.

11. Apparatus according to claim 10, wherein the means for deflecting the flexible disks is capable of deflecting at least one of the flexible disks sufficiently to close the fluid passage in a fluidtight manner.

12. Apparatus according to claim 1, further comprising a flexible disk in the casing and sealed around the periphery thereof to the casing, the flexible disk dividing the casing into two fluid passages, a first one of the fluid passages being the said annular shaped fluid passage and a second one of the fluid passages satisfying the fluid flow equations given for the first one of the fluid passages, and means for deflecting the flexible disk in either direction along the said axis of symmetry for the adjustment of the fluid passage geometries of each fluid passage, and wherein the fluid inlet cavity is one of two, similar fluid inlet cavities each forming an inlet to one of the fluid passages, and the fluid outlet means is one of two, similar fluid outlet means each forming a fluid outlet from one of the fluid passages.

13. Apparatus according to claim 12, wherein the means for deflecting the flexible disk is capable of deflecting the said disk sufficiently to close at least one fluid passage in a fluidtight manner.

14. Apparatus according to claim 12, further comprising means having a fluid outlet port and connecting the fluid outlet means from the said first annular shaped fluid passage to the fluid inlet cavity of the said second fluid passage.

* * * * *